US012684643B2

(12) United States Patent
Chen et al.

(10) Patent No.: US 12,684,643 B2
(45) Date of Patent: Jul. 14, 2026

(54) WIRELESS COMMUNICATION METHOD AND APPARATUS AND SYSTEM FOR BEAM FAILURE RECOVERY

(71) Applicant: 1FINITY Inc., Kawasaki (JP)

(72) Inventors: Zhe Chen, Beijing (CN); Lei Zhang, Beijing (CN); Jian Zhang, Beijing (CN); Qinyan Jiang, Beijing (CN)

(73) Assignee: 1FINITY Inc., Kawasaki (JP)

( * ) Notice: Subject to any disclaimer, the term of this patent is extended or adjusted under 35 U.S.C. 154(b) by 506 days.

(21) Appl. No.: 18/130,956

(22) Filed: Apr. 5, 2023

(65) Prior Publication Data

US 2023/0247707 A1 Aug. 3, 2023

Related U.S. Application Data

(63) Continuation of application No. PCT/CN2020/121082, filed on Oct. 15, 2020.

(51) Int. Cl.

*H04W 76/19* (2018.01)
*H04B 7/06* (2006.01)
*H04L 5/00* (2006.01)

(52) U.S. Cl.

CPC .................................. *H04W 76/19* (2018.02)

(58) Field of Classification Search

CPC ............... H04W 76/19; H04B 7/06968; H04B 7/06964; H04L 5/0023; H04L 5/0048; H04L 5/0053

See application file for complete search history.

(56) References Cited

U.S. PATENT DOCUMENTS

2018/0054348 A1* 2/2018 Luo ...................... H04B 7/0626
2019/0081753 A1 3/2019 Jung et al.

(Continued)

FOREIGN PATENT DOCUMENTS

CA 3 127 395 A1 7/2020
CN 109644056 A 4/2019

(Continued)

OTHER PUBLICATIONS

The partial supplementary European search report issued by the European Patent Office for corresponding European Patent Application No. 20957101.7-1206, mailed on Nov. 7, 2023.

(Continued)

*Primary Examiner* — Harry H Kim

(74) *Attorney, Agent, or Firm* — Myers Wolin, LLC

(57) ABSTRACT

A wireless communication apparatus, configured in a terminal equipment, the terminal equipment being related to at least two transmission and reception points (TRPs), includes a monitor configured to monitor second downlink control information according to an antenna port quasi-collocation (QCL) parameter the same as an antenna port QCL parameter associated with a first reference signal after the terminal equipment receives first downlink control information associated with beam failure or link failure, wherein, the first reference signal is associated with a first TRP in the at least two TRPs, a TRP associated with the second downlink control information is identical to the first TRP associated with the first reference signal, and the first reference signal is identified from at least one reference signal for beam recovery.

19 Claims, 9 Drawing Sheets

(56) References Cited

U.S. PATENT DOCUMENTS

| | | | | |
|---|---|---|---|---|
| 2019/0320469 | A1* | 10/2019 | Huang | H04L 5/0053 |
| 2020/0153581 | A1* | 5/2020 | Tsai | H04B 7/024 |
| 2020/0287678 | A1* | 9/2020 | Li | H04W 72/23 |
| 2021/0160923 | A1* | 5/2021 | Zhang | H04W 74/0833 |
| 2021/0184812 | A1* | 6/2021 | MolavianJazi | H04L 1/0041 |
| 2021/0351834 | A1* | 11/2021 | Yang | H04W 72/046 |
| 2023/0139655 | A1* | 5/2023 | Guo | H04W 36/085 370/329 |

FOREIGN PATENT DOCUMENTS

| | | | |
|---|---|---|---|
| CN | 110011766 | A | 7/2019 |
| CN | 110677928 | A | 1/2020 |
| CN | 111278122 | A | 6/2020 |
| WO | 2020/012619 | A1 | 1/2020 |
| WO | 2020/059146 | A1 | 3/2020 |

OTHER PUBLICATIONS

International Search Report and Written Opinion of the International Searching Authority issued by the China National Intellectual Property Administration for corresponding International Patent Application No. PCT/CN2020/121082, mailed on May 26, 2021, with an English translation.

Notice of Reasons for Refusal issued by the Japan Patent Office for corresponding Japanese Patent Application No. 2023-521497, mailed on Jun. 18, 2024, with an English translation.

NTT Docomo, Inc, "Discussion on beam management for MTRP", Agenda Item: 8.1.2.3, 3GPP TSG-RAN WG1 #102-e, R1-2006721, e-Meeting, Aug. 17-28, 2020.

Communication pursuant to Article 94(3) EPC issued by the European Patent Office for corresponding European Patent Application No. 20957101.7, mailed on Mar. 27, 2025.

First Notification of Office Action and Search Report issued by the China National Intellectual Property Administration for corresponding Chinese Patent Application No. 202080105383.2, mailed on May 30, 2024, with an English translation.

Communication pursuant to Article 94(3) EPC issued by the European Patent Office for corresponding European Patent Application No. 20957101.7, mailed on May 4, 2026.

* cited by examiner

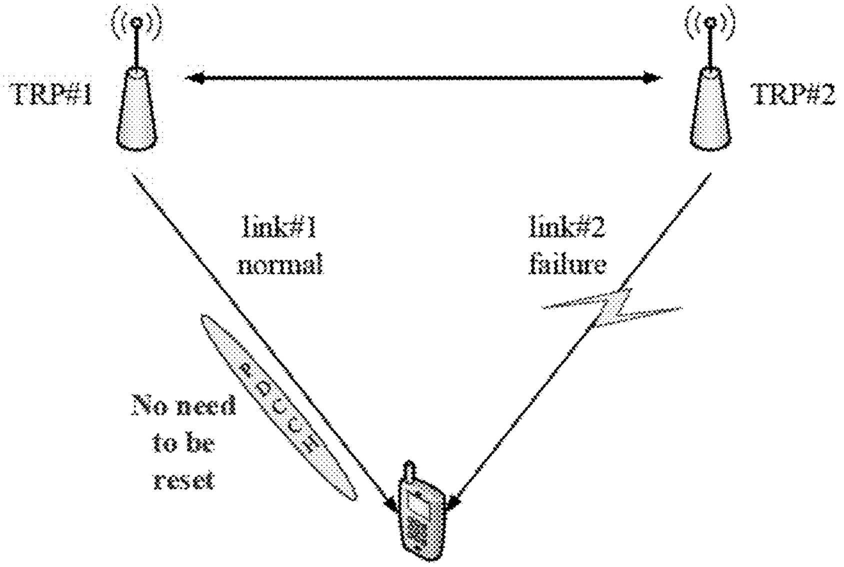

FIG. 5

*600* the terminal equipment transmits second information to the network device, the second information being associated with an index of the first reference signal and/or an index of the first TRP

*601* the terminal equipment monitors second downlink control information according to an antenna port QCL parameter the same as an antenna port QCL parameter associated with a first reference signal after the terminal equipment receives first downlink control information associated with beam failure or link failure

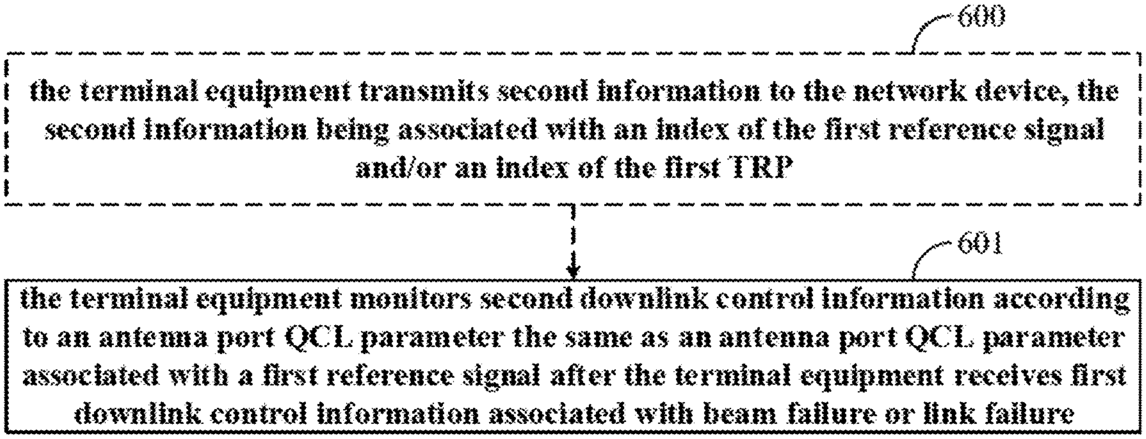

FIG. 6 the terminal equipment transmits second information to the network device, the second information being associated with an index of the first reference signal and/or an index of the first TRP the terminal equipment transmits first uplink control information according to a spatial filter and/or power associated with a first reference signal after the terminal equipment receives first downlink control information associated with beam failure or link failure

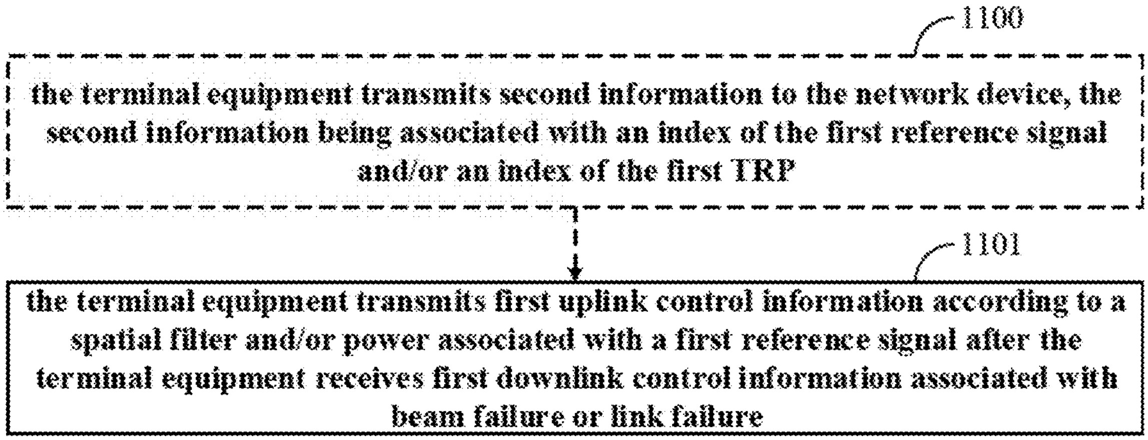

FIG. 11

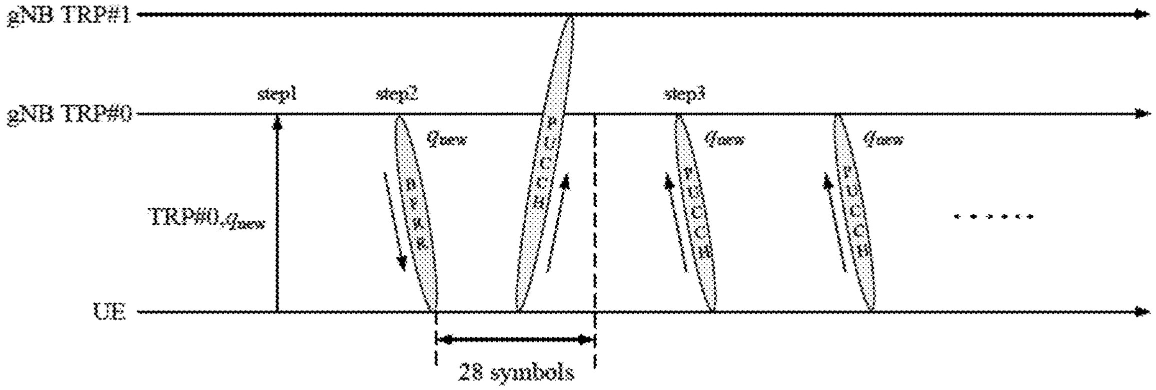

FIG. 12

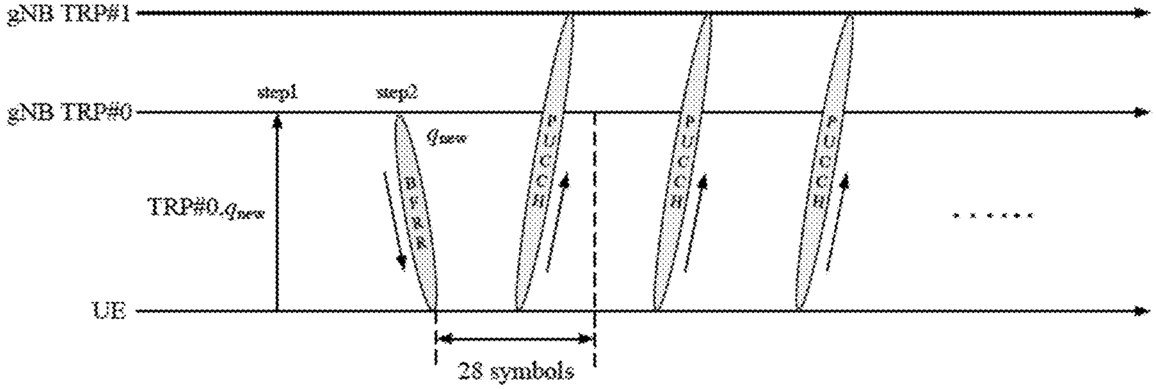

FIG. 13 the network device transmits configuration information to a terminal equipment, the configuration information configuring that the terminal equipment is associated with at least two TRPs — 1401 the network device receives second information transmitted by the terminal equipment, the second information being related to an index of a first reference signal and/or an index of a TRP associated with the first reference signal — 1402 the network device identifies the first reference signal according to the second information, and transmits first downlink control information to the terminal equipment — 1403

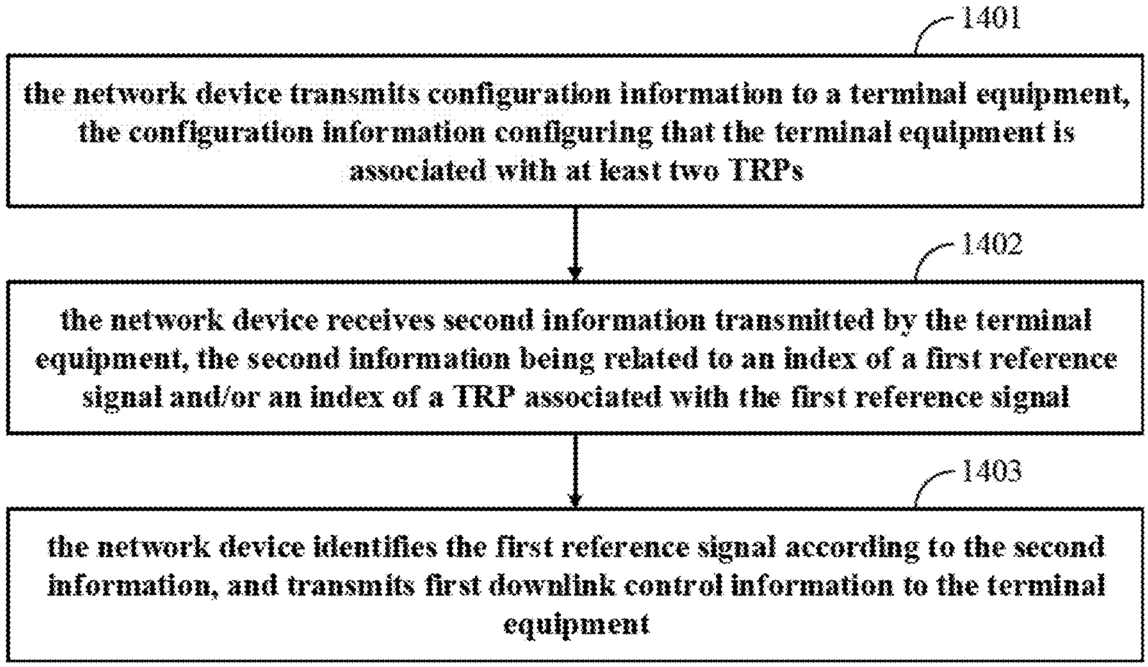

FIG. 14

— 1500
wireless communication apparatus transmitting unit — 1503 receiving unit — 1502 monitoring unit — 1501

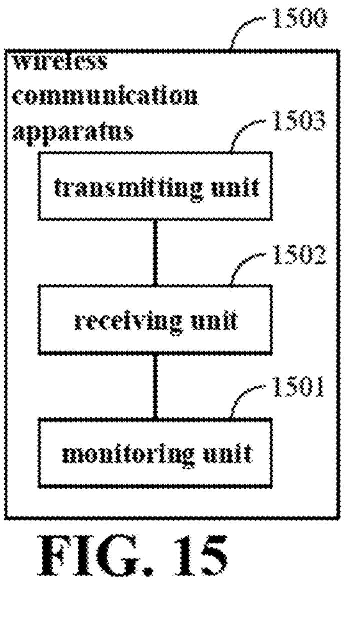

FIG. 15

— 1600
wireless communication apparatus second transmitting unit — 1603 receiving unit — 1602 first transmitting unit — 1601

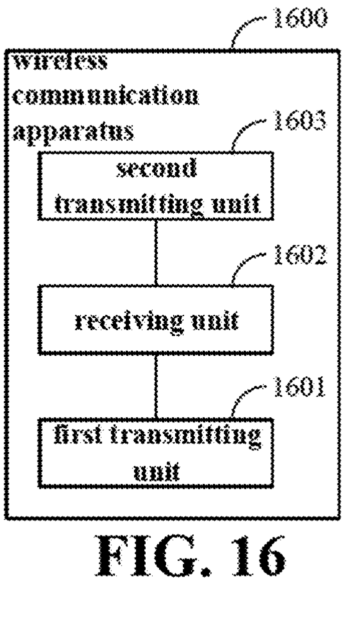

FIG. 16

— 1700
wireless communication apparatus first transmitting unit — 1701 receiving unit — 1702 second transmitting unit — 1703

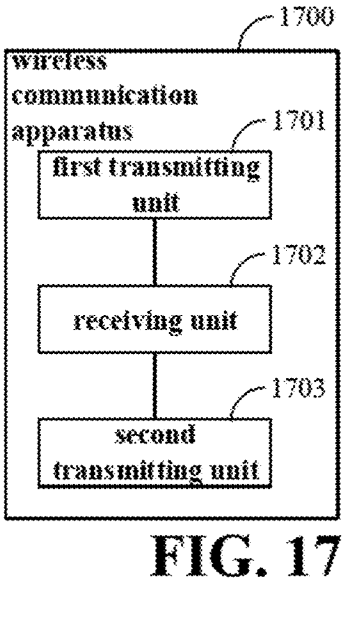

FIG. 17

WIRELESS COMMUNICATION METHOD AND APPARATUS AND SYSTEM FOR BEAM FAILURE RECOVERY

CROSS-REFERENCE TO RELATED APPLICATION

This application is a continuation application of International Application PCT/CN2020/121082 filed on Oct. 15, 2020 and designated the U.S., the entire contents of which are incorporated herein by reference.

FIELD

This disclosure relates to the field of communications.

BACKGROUND

A central transmission frequency of an NR (New Radio) system is up to 52.6 GHz. When the central transmission frequency is relatively high, a channel corresponding to a link is easily blocked by a blockage due to the poor diffraction ability of a high-frequency signal, thereby resulting in a link failure.

In order to recover the link quickly, beam failure recovery procedures, or link recovery procedures, are introduced into the NR. Such procedures may assist a terminal equipment and a network device in quickly switching from a blocked channel (of relatively poor quality) to an unblocked channel (of relatively good quality), thereby improving link quality and reducing latency.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

It was found by the inventors that for an NR communication system, a network side usually includes a plurality of distributed transmission and reception points (TRPs). Generally speaking, in order to increase throughput, a terminal equipment communicates with two TRPs at the same time. In other words, the terminal equipment establishes links with the two TRPs respectively, such as Link #1 and Link #2 shown in FIG. 1. In this scenario, especially when a central transmission frequency is relatively high, a channel corresponding to each link is easily blocked by a blockage, thereby resulting in link failures (such as link #2). However, according to existing link recovery procedures, when a beam failure occurs on only one of the above two links, link recovery is unable to be performed on a link of a specific TRP (i.e., the link wherein the beam failure occurs, such as link #2 as shown in FIG. 1). This causes degradation of a reliability of the link and increase of latency.

In order to solve the above problems or other similar problems, embodiments of this disclosure provide a wireless communication method and apparatus and a system thereof, in which an NR system is enabled to perform a link recovery procedure on a TRP where a link failure occurs, thereby increasing a reliability of the system.

According to an aspect of the embodiments of this disclosure, there is provided a wireless communication method, applicable to a terminal equipment, the terminal equipment being related to at least two TRPs, the method including:

the terminal equipment monitors second downlink control information according to an antenna port QCL parameter the same as an antenna port QCL parameter associated with a first reference signal after the terminal equipment receives first downlink control information associated with beam failure or link failure, wherein, the first reference signal is associated with a first TRP in the at least two TRPs, a TRP associated with the second downlink control information is identical to the first TRP associated with the first reference signal, and the first reference signal is identified from at least one reference signal for beam recovery.

According to another aspect of the embodiments of this disclosure, there is provided a wireless communication method, applicable to a terminal equipment, the terminal equipment being related to at least two TRPs, the method including:

the terminal equipment transmits first uplink control information according to a spatial filter and/or power associated with a first reference signal after the terminal equipment receives first downlink control information associated with beam failure or link failure, wherein, the first reference signal is associated with a first TRP in the at least two TRPs, a TRP associated with the first uplink control information is identical to the first TRP associated with the first reference signal, and the first reference signal is identified from at least one reference signal for beam recovery.

According to a further aspect of the embodiments of this disclosure, there is provided a wireless communication apparatus, configured in a terminal equipment, the terminal equipment being related to at least two TRPs, the apparatus including:

a monitoring unit configured to monitor second downlink control information according to an antenna port QCL parameter the same as an antenna port QCL parameter associated with a first reference signal after the terminal equipment receives first downlink control information associated with beam failure or link failure, wherein, the first reference signal is associated with a first TRP in the at least two TRPs, a TRP associated with the second downlink control information is identical to the first TRP associated with the first reference signal, and the first reference signal is identified from at least one reference signal for beam recovery.

According to still another aspect of the embodiments of this disclosure, there is provided a wireless communication apparatus, configured in a terminal equipment, the terminal equipment being related to at least two TRPs, the apparatus including:

a transmitting unit configured to transmit first uplink control information according to a spatial filter and/or power associated with a first reference signal after the terminal equipment receives first downlink control information associated with beam failure or link failure, wherein, the first reference signal is associated with a first TRP in the at least two TRPs, a TRP associated with the first uplink control information is identical to the first TRP associated with the first reference signal, and the first reference signal is identified from at least one reference signal for beam recovery.

An advantage of the embodiments of this disclosure exists in that on the one hand, by determining the QCL parameters used for monitoring the PDCCH (the second downlink control information) according to the TRP where link recovery occurs, after the link recovery related to a TRP is successful, the terminal equipment may monitor the PDCCH by using appropriate QCL parameters according to the relationship between the TRP and PDCCH, thereby improving reliability of the system. On the other hand, by determining the spatial filter and/or power control parameters used for transmitting the PUCCH (the first uplink control information) according to the TRP where the link recovery occurs, after the link recovery related to a TRP is successful, the terminal equipment may transmit the PUCCH by using appropriate spatial filter and/or power control parameters according to whether the PUCCH is transmitted via the TRP, thereby improving reliability of the system.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings:

FIG. 5 is a schematic diagram of a further example of the NR communication system;

FIG. 6 is a schematic diagram of an example of the wireless communication method of an embodiment a first aspect of this disclosure;

FIG. 11 is a schematic diagram of an example of the wireless communication method of an embodiment a second aspect of this disclosure;

FIG. 12 is a schematic diagram of a link recovery procedure;

FIG. 13 is another schematic diagram of the link recovery procedure;

FIG. 14 is a schematic diagram of an example of the wireless communication method of an embodiment a third aspect of this disclosure;

FIG. 15 is a schematic diagram of the wireless communication apparatus of an embodiment a fourth aspect of this disclosure;

FIG. 16 is a schematic diagram of the wireless communication apparatus of an embodiment a fifth aspect of this disclosure;

FIG. 17 is a schematic diagram of an example of the wireless communication apparatus of an embodiment a sixth aspect of this disclosure;

DETAILED DESCRIPTION OF THE DISCLOSURE

Figure 1:
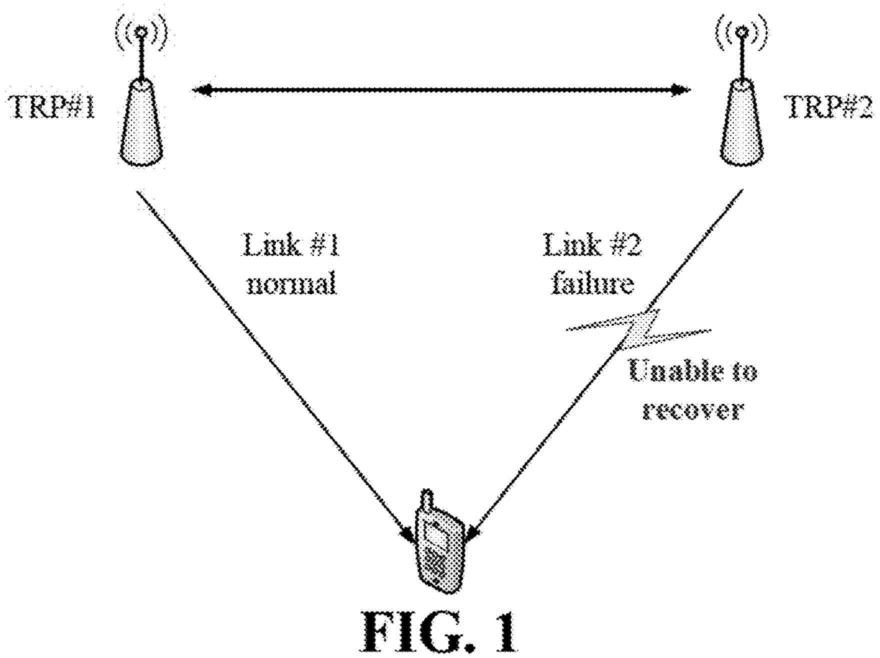
FIG. 1 is schematic diagram of an example of an NR communication system.

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the"

should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G, and 5G and new radio (NR) in the future, and/or other communication protocols that are currently known or will be developed in the future.

In the embodiments of this disclosure, the term "network device", for example, refers to a device in a communication system that accesses a user equipment to the communication network and provides services for the user equipment. The network device may include but not limited to the following equipment: a base station (BS), an access point (AP), a transmission reception point (TRP), a broadcast transmitter, a mobile management entity (MME), a gateway, a server, a radio network controller (RNC), a base station controller (BSC).

The base station may include but not limited to a node B (NodeB or NB), an evolved node B (eNodeB or eNB), and a 5G base station (gNB). Furthermore, it may include a remote radio head (RRH), a remote radio unit (RRU), a relay, or a low-power node (such as a femto, and a pico). The term "base station" may include some or all of its functions, and each base station may provide communication coverage for a specific geographical area. And a term "cell" may refer to a base station and/or its coverage area, depending on a context of the term.

In the embodiments of this disclosure, the term "user equipment (UE)" refers to, for example, an equipment accessing to a communication network and receiving network services via a network device, and may also be referred to as "a terminal equipment (TE)". The terminal equipment may be fixed or mobile, and may also be referred to as a mobile station (MS), a terminal, a subscriber station (SS), an access terminal (AT), or a station, etc.

The terminal equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal.

In order to make the embodiments of this disclosure clear and understandable, some concepts and definitions concerned in the embodiments of this disclosure shall be described below.

Generally speaking, in an NR communication system, a beam failure recovery procedure mainly includes the following five steps.

1. Beam failure detection. A UE determines whether a beam failure occurs in a downlink control channel by measuring a reference signal related to the downlink control channel.

2. New candidate beam identification. The UE measures a reference signal corresponding to a candidate beam.

3. Beam failure request (BFRQ). When the UE finds a beam failure and finds some available candidate beams at the same time, the UE selects a beam with an index $q_{new}$ from these available candidate beams. Thereafter, the UE transmits a beam failure request to a base station, wherein an index of a candidate beam reported in the beam failure request is $q_{new}$.

4. gNB response reception or beam failure recovery response (BFRR) reception. After transmitting the beam failure request, the UE correspondingly monitors response of the gNB on the beam failure request.

Figure 2:
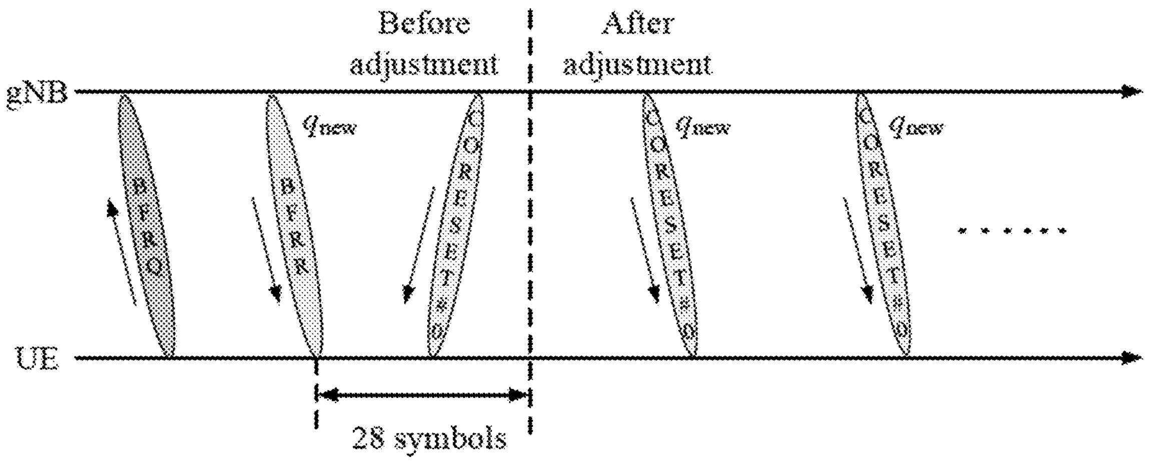
FIG. 2 is a schematic diagram of adjustment of PDCCH monitoring in CORESET #0.
Figure 3:
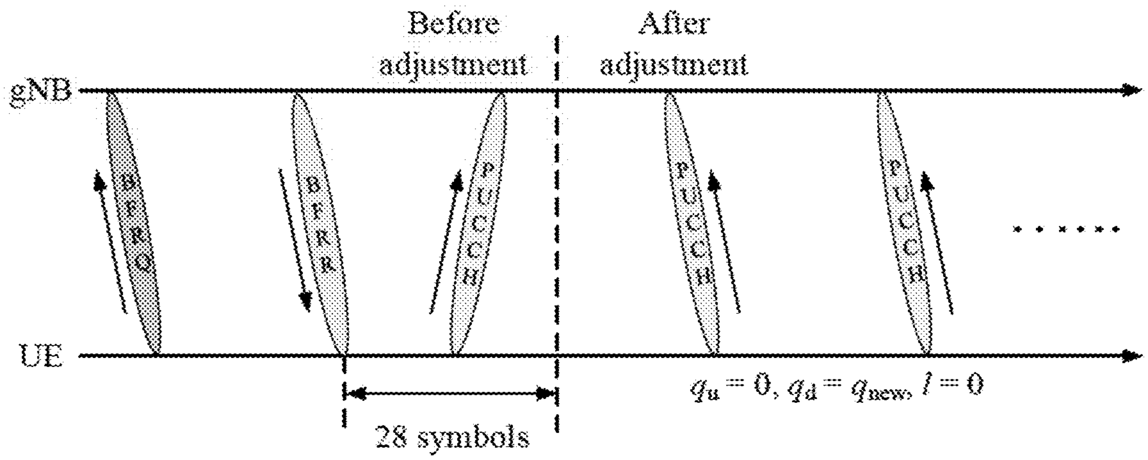
FIG. 3 is a schematic diagram of adjustment of a PUCCH.

5. After receiving the above gNB response, the UE adjusts transmission/reception parameters of a part of channels.

a) Adjusting PDCCH monitoring in CORESET #0 (see FIG. 2)

i. In a PCell or a PSCell, after 28 symbols from receiving the gNB response, the UE monitors the PDCCH in CORESET #0 according to an antenna port quasi-collocation (QCL) parameter corresponding to the identified candidate beam ($q_{new}$).

b) Adjusting a PUCCH (see FIG. 3)

i. In a PCell or a PSCell, after 28 symbols from receiving gNB response and before receiving MAC-CE signaling or RRC signaling used to change a PUCCH spatial relationship, the UE transmits the PUCCH on a cell where the beam failure request is transmitted before, according to the following description:

1. A spatial filter used by the PUCCH is identical to a spatial filter for transmitting the beam failure request;

2. A part of power control parameters used by the PUCCH are related to a reference signal index corresponding to the previously identified candidate beam ($q_d=q_{new}$), and the other part of power control parameters are reset to be 0 ($q_u=0$; $l=0$).

In order to solve the problem in an existing system, that is, a link recovery procedure is unable to be performed on a link corresponding to a TRP where a link failure occurs, the embodiments of this disclosure propose corresponding solutions to enable an NR system to recover a link corresponding to a TRP where a link failure occurs, so as to improve reliability of the system.

Various embodiments of this disclosure shall be described below with reference to the accompanying drawings. These embodiments are illustrative only and are not intended to limit this disclosure.

Embodiment of a First Aspect

The embodiment of this disclosure provides a wireless communication method, which shall be described from a side of a terminal equipment, the terminal equipment being related to at least two TRPs.

According to the embodiment of this disclosure, a QCL parameter for monitoring PDCCH may be determined according to a TRP implementing a link recovery procedure; the advantage thereof is that after a terminal equipment receives a gNB response, the terminal equipment may monitor the PDCCH by using an appropriate QCL parameter according to the relationship between the TRP and the PDCCH, thereby improving the reliability of the system.

Figure 4:
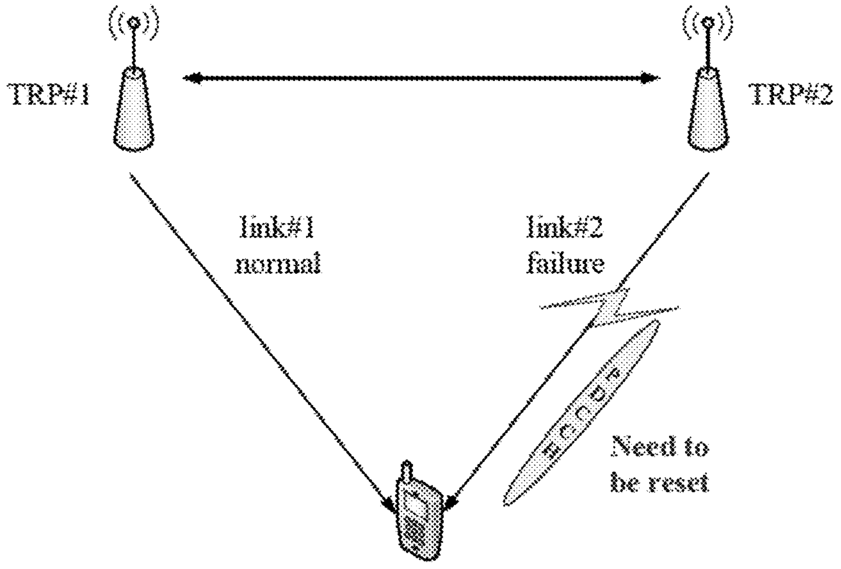
FIG. 4 is a schematic diagram of another example of the NR communication system.

As shown in FIG. 4, when a PDCCH is transmitted via TRP #2 (with a link failure), the terminal equipment needs to reset the QCL parameter used to monitor the PDCCH after receiving the gNB response; the advantage thereof is that, only when a PDCCH is transmitted via the TRP with a link failure, the UE resets the QCL parameter used to monitor the one PDCCH.

As shown in FIG. 5, corresponding to the case in FIG. 4, when a PDCCH is transmitted via TRP #1 (with a normal link), after the terminal equipment receives the gNB response, the terminal equipment does not need to reset the QCL parameter used to monitor the PDCCH; the advantage thereof is to avoid the terminal equipment from incorrectly adjusting the QCL parameter used to monitor the PDCCH, thereby avoiding degradation of reliability of the downlink control channel.

FIG. 6 is a schematic diagram of the wireless communication method of the embodiment of this disclosure. Referring to FIG. 6, the method includes:

601: the terminal equipment monitors second downlink control information according to an antenna port QCL parameter the same as an antenna port QCL parameter associated with a first reference signal after the terminal equipment receives first downlink control information associated with beam failure or link failure, wherein, the first reference signal is associated with a first TRP in the at least two TRPs, a TRP associated with the second downlink control information is identical to the first TRP associated with the first reference signal, and the first reference signal is identified from at least one reference signal for beam recovery.

According to the embodiment of this disclosure, it may be ensured that in a case where the UE is associated with a plurality of TRPs, the UE may monitor the PDCCH associated with the TRP more reliably by using the reference signal of the identified (selected by measuring) beam recovery after receiving the beam failure response from the gNB side according to the TRP where a beam failure occurs. As the UE experiences a link failure at the TRP, the original beam direction used for monitoring the PDCCH associated with the TRP is no longer reliable. Therefore, after the beam failure response is received from the gNB side, the beam direction of the PDCCH is reset to the beam direction corresponding to the previously identified candidate beam. Hence, the UE monitors the PDCCH according to the beam direction corresponding to the previously identified candidate beam.

In the embodiment of this disclosure, the TRP is equivalent to at least one of the following:

a control resource set (CORESET) pool; or a transmission configuration indication (TCI) state.

In the embodiment of this disclosure, that the terminal equipment is related to at least two TRPs refers to that the terminal equipment is configured with control resource sets (CORESETs) for the at least two TRPs. For example, if the terminal equipment is configured with a first control resource set and a second control resource set on an active downlink BWP of a serving cell, the first control resource set being not configured with CORESETPoolIndex or being configured with CORESETPoolIndex with a value of 0, and the second control resource set being configured with CORESETPoolIndex with a value of 1, it is deemed that the terminal equipment is related to two TRPs. That is, in some embodiments, that the terminal equipment is related to at least two TRPs refers to that on an active downlink BWP of a serving cell, the terminal equipment is configured with a first control resource set and a second control resource set, wherein, the first control resource set is not configured with a CORESETPoolIndex or is configured with a CORESETPoolIndex with a value 0, and the second control resource set is configured with a CORESETPoolIndex with a value 1.

In the embodiments of this disclosure, in some embodiments, that the first reference signal is related to the first TRP is indicated via RRC signaling.

For example, an ID of the TRP corresponding to the first reference signal is indicated via the RRC signaling, that is, that the first reference signal is related to the first TRP is indicated via the ID of the TRP. Therefore, a relationship between the candidate beam and the corresponding TRP is explicitly configured via the RRC signaling, such that the UE is enabled to correctly find the corresponding candidate beam for beam recovery according to the TRP where a beam failure (link failure) occurs.

For another example, the RRC signaling is RRC signaling for indicating the first TRP, that is, the RRC signaling acts on the first TRP, and it may further be determined that the first reference signal indicated by the RRC signaling is related to the first TRP. Therefore, the relationship between the candidate beam and the corresponding TRP is indicated via a plurality of pieces of RRC signaling for different TRPs, such that the UE is enabled to correctly find a corresponding candidate beam for beam recovery according to the TRP where a beam failure (link failure) occurs. Reference signals acting on different TRPs are grouped (divided into a plurality of pieces of RRC signaling) in this method, and the terminal equipment may learn a relationship between reference signals included in each group (RRC signaling) and the TRP according to a relationship between each group (RRC signaling) and the TRP. In this way, it may be avoided to indicate an association between each candidate beam and the TRP one by one, thereby lowering signaling overhead.

In the embodiments of this disclosure, in some embodiments, that the first reference signal is identified from at least one reference signal for beam recovery refers to that the first reference signal is identified from a candidate beam reference signal associated with the first TRP in a candidate beam reference signal list, or, the first reference signal is identified from a candidate beam reference signal list for the first TRP.

In the embodiments of this disclosure, in some embodiments, that the TRP associated with the second downlink control information is identical to the first TRP associated with the first reference signal refers to that the second downlink control information is monitored in a control resource set (CORESET), and the TRP associated with the control resource set (CORESET) is identical to the first TRP. That is, if the second downlink control information is monitored in a control resource set and the TRP associated with the control resource set is identical to the TRP associated with the first reference signal, the terminal equipment monitors the second downlink control information in the control resource set according to an antenna port quasi-collocation parameter associated with the first reference signal.

In the embodiment of this disclosure, the terminal equipment receives the first downlink control information according to the antenna port QCL parameter associated with the first reference signal. That is, the antenna port QCL parameter used to receive the first downlink control information and the antenna port QCL parameter used to monitor the second downlink control information are identical, and are both identical to the antenna port QCL parameter associated with the first reference signal.

In the embodiment of this disclosure, the first downlink control information is also related to the first TRP. Thus, a time interval between transmission of the first downlink control information (BFRR) and subsequent transmission of the second downlink control information (PDCCH) with the beam direction being reset may be reduced, and the system performance may be improved. For example, when an interaction time between different TRPs is relatively long, if the first downlink control information and the subsequent second downlink control information with the beam direction being reset are transmitted via different TRPs, after the first downlink control information is transmitted via one TRP, another TRP may confirm the transmission after a long time, and then adjust the beam direction for transmitting second downlink control information, which leads to higher latency and degradation of system performance.

In some embodiments, that the first downlink control information is related to the first TRP refers to that the first downlink control information is received in a BFR search space, and the BFR search space is related to the first TRP.

In some embodiments, that the first downlink control information is related to the first TRP refers to that the first downlink control information is received in a control resource set, and the control resource set is related to the first TRP.

In the embodiments of this disclosure, in some embodiments, as shown in FIG. 6, before the terminal equipment receives the first downlink control information, the method further includes:

600: the terminal equipment transmits second information to the network device, the second information being associated with an index of the first reference signal and/or an index of the first TRP.

Therefore, the network device may determine the first reference signal based on the index of the TRP and the index of the reference signal, and then transmit the first downlink control information and/or the second downlink control information according to spatial information (QCL parameter) of the reference signal. In some embodiments, the index of the first reference signal is expressed as $q_{new}$.

In the embodiments of this disclosure, in some embodiments, the second downlink control information is monitored in a control resource set, an index of the control resource set being 0. That is, the second downlink control information is monitored in the control resource set CORESET #0 with an index 0. Therefore, when a TRP corresponding to CORESET #0 is identical to the TRP associated with the first reference signal (both are the first TRP), the terminal equipment may monitor the second downlink control information in CORESET #0 according to the antenna port QCL parameter associated with the first reference signal. However, this disclosure is not limited thereto, and the index of the control resource set may also be other IDs than 0.

In the embodiments of this disclosure, in some embodiments, that after the terminal equipment receives the first downlink control information refers to after 28 symbols from the last symbol of the first downlink control information is received by the terminal equipment. Before that, the terminal equipment may receive the downlink control information associated with the first TRP by using other beams, which is not limited in this disclosure.

In the embodiments of this disclosure, in some embodiments, the terminal equipment may monitor the second downlink control information in a primary cell, and may also monitor the second downlink control information in a secondary cell. Here, the primary cell is, for example, a PCell, and a PSCell, etc., and the secondary cell is, for example, an SCell, etc., and reference may be made to relevant techniques for definitions thereof, which shall not be described herein any further.

The method of the embodiment of this disclosure shall be described below by way of an example.

In this example, it is taken as an example that a cell in which the UE operates is a PCell, the control resource set used to monitor the second downlink control information is CORESET #0, and the UE is related to two TRPs, or, a control resource set configured for the UE is related to two TRPs.

That the control resource set configured for the UE is related to two TRPs is that, for example, if a UE is configured with first CORESETs and second CORESETs on a active downlink BWP of the serving cell, these first CORESETs are not configured with CORESETPoolIndex or are configured with CORESETPoolIndex with a value of 0, and these second CORESETs are configured with CORESETPoolIndex with a value of 1, it is deemed that the UE is related to two TRPs.

Figure 7:
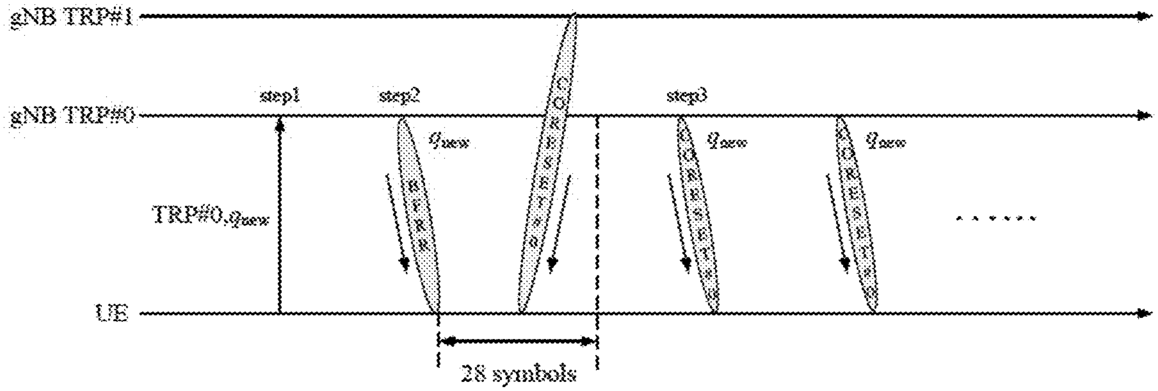
FIG. 7 is a schematic diagram of a link recovery procedure.

The above conditions may be described as follows:

If a UE
- ➢ is not provided CORESETPoolIndex or is provided CORESETPoolIndex with a value of 0 for first CORESETs on active DL BWPs of serving cells, and
- ➢ is provided CORESETPoolIndex with a value of 1 for second CORESETs on active DL BWPs of the serving cells, In this example, assuming that the UE finds that a beam failure (link failure) occurs in a link related to TRP #0 by detecting a reference signal related to TRP #0 (such as detecting a reference signal related to a CORESET configured with no CORESETPoolIndex or configured with CORESETPoolIndex with a value of 0), the UE starts a corresponding link recovery procedure. FIG. 7 shows the link recovery procedure. As shown in FIG. 7, during the link recovery procedure, the UE may execute the following steps:

step 1: the UE transmits uplink information (the above second information) to the gNB (gNB TRP #0), the uplink information being, for example, transmitted via a PRACH or a PUCCH; the uplink information may be information (such as the index of the first reference signal, which may be expressed as $q_{new}$) related to the identified candidate beam RS (the above first reference signal), and the uplink information may also be the index (TRP #0) of the TRP associated with the reference signal;

a method for acquiring $q_{new}$ is as described above, and shall not be described herein any further;

step 2: the UE receives beam failure recovery response (BFRR, the above first downlink control signal) according to the antenna port QCL parameter associated with the above reference signal (the index of the reference signal is $q_{new}$);

the above BFRR is response of step 1, which may be a DCI format scrambled by a C-RNTI or an MCS-C-RNTI, or a DCI format scrambled by C-RNTI and used for scheduling a PUSCH;

step 3: after 28 symbols from the last symbol of the above BFRR is received by the UE, when CORESET #0 corresponds to TRP #0, or, when CORESETPoolIndex of CORESET #0 is identical to CORESETPoolIndex associated with the above reference signal, the UE monitors the PDCCH in CORESET #0 according to the antenna port QCL parameter associated with the reference signal.

As shown in FIG. 7, after receiving the last symbol of the BFRR by the UE and before the above-mentioned 28 symbols, the UE may possibly also monitor and receive the PDCCH from another TRP (such as TRP #1 shown in FIG. 7).

Figure 8:
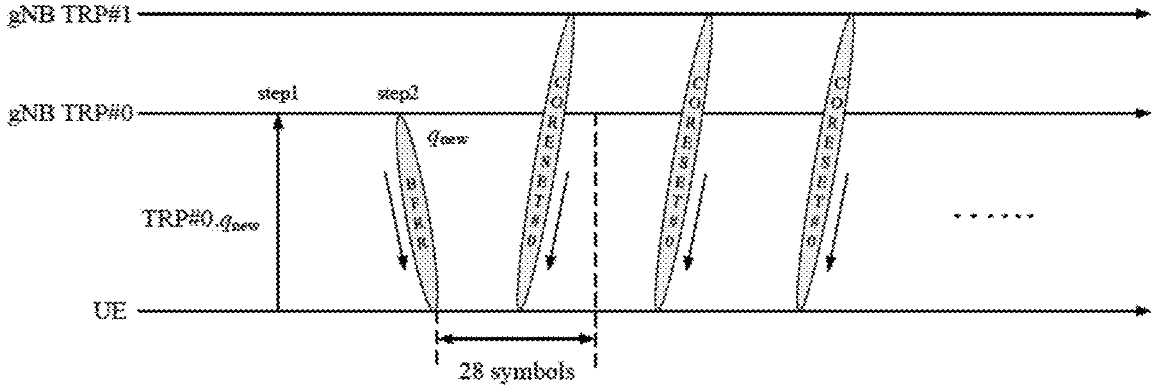
FIG. 8 is another schematic diagram of the link recovery procedure.

FIG. 8 shows a case corresponding to the case in FIG. 7. As shown in FIG. 8, if other conditions are similar, but CORESET #0 is related to TRP #1, the QCL parameters associated with CORESET #0 is not adjusted, that is, there is no step 3 in FIG. 7.

It should be noted that FIG. 6 only schematically illustrates the embodiment of this disclosure; however, this disclosure is not limited thereto. For example, an order of execution of the steps may be appropriately adjusted, and furthermore, some other steps may be added, or some steps therein may be reduced. And appropriate variants may be made by those skilled in the art according to the above contents, without being limited to what is contained in FIG. 6.

According to the method of the embodiment of this disclosure, by determining the QCL parameters for monitoring the PDCCH (the second downlink control information) according to the TRP where link recovery occurs, after receiving the gNB response, the terminal equipment may monitor the PDCCH by using appropriate QCL parameters according to the relationship between the TRP and the PDCCH, thereby improving the reliability of the system.

Embodiment of a Second Aspect

The embodiment of this disclosure provides a wireless communication method, which shall be described from a side of a terminal equipment, the terminal equipment being related to at least two TRPs.

According to the embodiment of this disclosure, a spatial domain filter and/or a power control parameter for transmitting a PUCCH may be determined according to a TRP implementing a link recovery procedure; the advantage thereof is that after a terminal equipment receives a gNB response, the terminal equipment may transmit the PUCCH by using an appropriate spatial domain filter and/or a power control parameter according to whether the PUCCH is transmitted via the TRP, thereby improving the reliability of the system.

Figure 9:
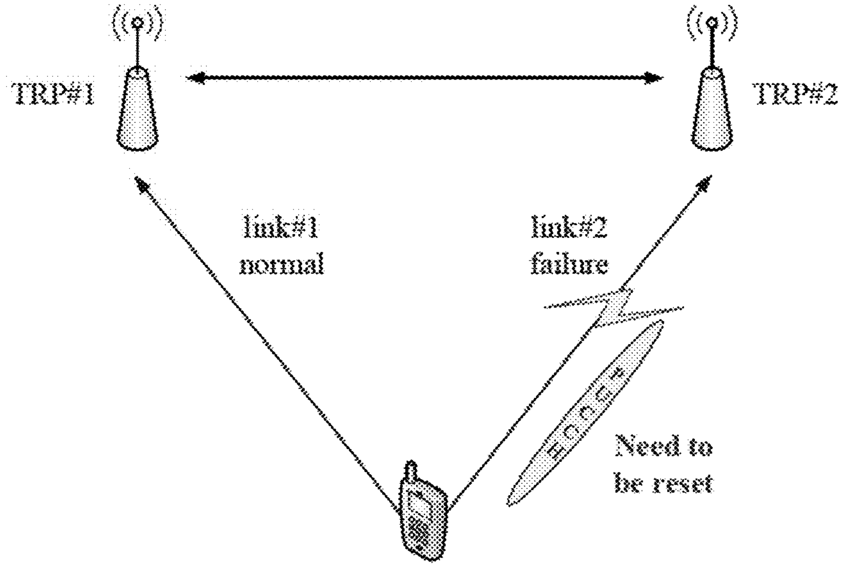
FIG. 9 is a schematic diagram of still another example of the NR communication system.

As shown in FIG. 9, when a PUCCH is transmitted to TRP #2 (with a link failure), the terminal equipment needs to reset the spatial domain filter and/or power control parameter for transmitting the PUCCH after receiving the gNB response; the advantage thereof is that the UE resets the spatial domain filter and/or power control parameter for transmitting the PUCCH only when the PUCCH is transmitted to the TRP with a link failure.

Figure 10:
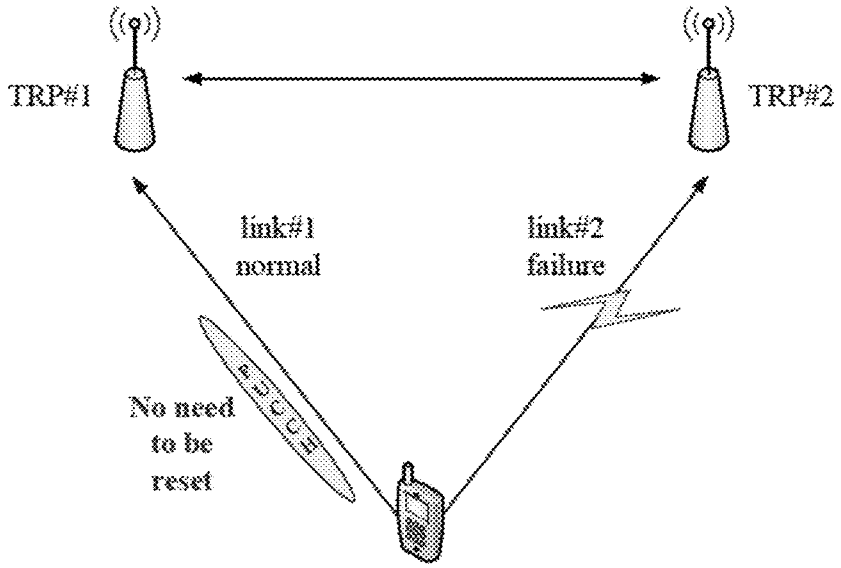
FIG. 10 is a schematic diagram of yet another example of the NR communication system.

As shown in FIG. 10, corresponding to the case in FIG. 9, when a PUCCH is transmitted to TRP #1 (with a normal link), after the terminal equipment receives the gNB response, the terminal equipment does not need to reset the spatial domain filter and/or power control parameter for transmitting the PUCCH; the advantage thereof is to avoid the terminal equipment from incorrectly adjusting the spatial domain filter for transmitting the PUCCH, thereby avoiding degradation of reliability of the uplink control channel.

FIG. 11 is a schematic diagram of the wireless communication method of the embodiment of this disclosure. Referring to FIG. 11, the method includes:

1101: the terminal equipment transmits first uplink control information according to a spatial filter and/or power associated with a first reference signal after the terminal equipment receives first downlink control information associated with beam failure or link failure, wherein, the first reference signal is associated with a first TRP in the at least two TRPs, a TRP associated with the first uplink control information is identical to the first TRP associated with the first reference signal, and the first reference signal is identified from at least one reference signal for beam recovery.

According to the embodiment of this disclosure, it may be ensured that in a case where the UE is associated with a plurality of TRPs, the UE may transmit the PUCCH associated with the TRP more reliably by using the reference signal of the identified (selected by measuring) beam recovery after receiving the beam failure response from the gNB side according to the TRP where a beam failure occurs. As the UE experienced a link failure at the TRP, the original beam direction used by transmitting PUCCH associated with the TRP is no longer reliable. Therefore, after the beam failure response is received from the gNB side, the beam direction of the PUCCH is reset to the beam direction corresponding to the identified candidate beam before the beam failure response is received. Hence, the UE transmits the PUCCH according to the beam direction corresponding to the identified candidate beam before the beam failure response is received.

In the embodiment of this disclosure, the TRP is equivalent to at least one of the following:

a control resource set (CORESET) pool; or a transmission configuration indication (TCI) state.

In the embodiment of this disclosure, that the terminal equipment is related to at least two TRPs refers to that the terminal equipment is configured with control resource sets (CORESETs) for the above-mentioned at least two TRPs. For example, if the terminal equipment is configured with a first control resource set and a second control resource set on an active downlink BWP of a serving cell, the first control resource set being not configured with CORESETPoolIndex or being configured with CORESETPoolIndex with a value of 0, and the second control resource set being configured with CORESETPoolIndex with a value of 1, it is deemed that the terminal equipment is related to two TRPs. That is, in some embodiments, that the terminal equipment is related to at least two TRPs refers to that the terminal equipment is configured with a first control resource set and a second control resource set on an active downlink BWP of a serving cell, wherein, the first control resource set is not configured with a CORESETPoolIndex or is configured with a CORESETPoolIndex with a value 0, and the second control resource set is configured with a CORESETPoolIndex with a value 1.

In the embodiments of this disclosure, in some embodiments, that the first reference signal is related to the first TRP is indicated via RRC signaling.

For example, an ID of the TRP corresponding to the first reference signal is indicated via the RRC signaling, that is, that the first reference signal is related to the first TRP is indicated via the ID of the TRP. Therefore, a relationship between the candidate beam and the corresponding TRP is explicitly configured via the RRC signaling, such that the UE is enabled to correctly find the corresponding candidate beam for beam recovery according to the TRP where a beam failure (link failure) occurs.

For another example, the above RRC signaling is RRC signaling for indicating the first TRP, that is, the RRC signaling acts on the first TRP, thus that the first reference signal indicated by the RRC signaling is related to the first TRP may further be determined. Therefore, the relationship between the candidate beam and the corresponding TRP is indicated via a plurality of pieces of RRC signaling for different TRPs, such that the UE is enabled to correctly find a corresponding candidate beam for beam recovery according to the TRP where a beam failure (link failure) occurs. Reference signals acting on different TRPs are grouped (divided into a plurality of pieces of RRC signaling) in this method, and the terminal equipment may learn a relationship between reference signals included in each group (RRC signaling) and the TRP according to a relationship between each group (RRC signaling) and the TRP. In this way, it may be avoided to indicate an association between each candidate beam and the TRP one by one, thereby lowering signaling overhead.

In the embodiments of this disclosure, in some embodiments, that the first reference signal is identified from at least one reference signal for beam recovery refers to that the first reference signal is identified from a candidate beam reference signal associated with the first TRP in a candidate beam reference signal list, or, the first reference signal is identified from a candidate beam reference signal list for the first TRP.

In the embodiments of this disclosure, in some embodiments, that the TRP associated with the first uplink control information is identical to the first TRP associated with the first reference signal refers to that a TRP associated with the control resource set (CORESET) used for receiving the DCI triggering the first uplink control information is identical to the first TRP. That is, if transmission of a PUCCH is triggered by the DCI and the CORESET used for receiving the DCI is associated with the first TRP, the transmission of the PUCCH is associated with the first TRP.

For example, a CORESET corresponding to one piece of DCI is related to TRP #0, and the DCI schedules one PDSCH and indicates that transmission of one PUCCH is used for feeding back corresponding HARQ-ACK information. In this way, it may be said that the transmission of the PUCCH is related to TRP #0.

For another example, a CORESET corresponding to one piece of DCI is related to TRP #0, and the DCI activates at least one PDSCH and indicates that transmission of one PUCCH is used for feeding back HARQ-ACK information of a corresponding PDSCH. In this way, it may be said that the transmission of the PUCCH is related to TRP #0.

Therefore, by comparing the relationship between the DCI corresponding to the PUCCH and the TRP, the UE may be enabled to correctly find corresponding PUCCH transmission of which a spatial relationship needs to be reset according to the TRP where a beam failure (link failure) occurs. This enables the UE to transmit the PUCCH by using a correct beam, thereby improving the system performance.

In the above embodiment, the first uplink control information is associated with a DCI format, and a TRP associated with a CORESET used for receiving the DCI format is identical to the first TRP.

In the above embodiment, that the first uplink control information is associated with a DCI format refers to that the DCI format is used to trigger the first uplink control information. For example, transmission of the first uplink control information is triggered by a DCI format corresponding to the PDCCH received in the CORESET, and the CORESET is associated with the first TRP.

In the embodiments of this disclosure, in some other embodiments, that the TRP associated with the first uplink control information is identical to the first TRP associated with the first reference signal refers to that the reference signal for identifying a spatial setting corresponding to the first uplink control information is identical to the reference signal for beam failure detection associated with the first TRP and/or the reference signal for identifying the candidate beam for recovery. That is, if a reference signal for identifying a spatial setting corresponding to transmission of a PUCCH is identical to the first reference signal related to the first TRP, the PUCCH transmission is related to the first TRP; wherein the first reference signal refers to a reference signal for beam failure detection or for identifying the candidate beam for recovery.

For example, CSI-RS #1 is a reference signal for beam failure detection related to TRP #0, and CSI-RS #1 is also a reference signal for spatial setting of a PUCCH resource corresponding to PUCCH transmission. In this way, it may be said that the PUCCH transmission is related to TRP #0.

Therefore, with the relationship between the reference signal for beam failure recovery (beam failure detection and/or identification of a candidate beam) and the TRP, the UE may be enabled to correctly find corresponding PUCCH transmission of which a spatial relationship needs to be reset according to the TRP where a beam failure (link failure) occurs. This enables the UE to transmit the PUCCH by using a correct beam, thereby improving the system performance.

In the embodiments of this disclosure, in still some other embodiments, that the TRP associated with the first uplink control information is identical to the first TRP associated with the first reference signal refers to that a TRP associated with a resource corresponding to the first uplink control information is identical to the first TRP. In some embodiments, an ID of the TRP associated with the resource corresponding to the first uplink control information may be indicated by RRC signaling. That is, if the RRC signaling indicates that a PUCCH resource corresponding to PUCCH transmission is related to the first TRP, the PUCCH transmission is related to the first TRP.

For example, a resource corresponding to a PUCCH transmission is PUCCH-Resource #1. According to an indication of the RRC signaling, PUCCH-Resource #1 is associated with TRP #0. In this way, it may be said that the PUCCH transmission is related to TRP #0.

Therefore, the relationship between the PUCCH resources and TRPs is explicitly configured via the RRC signaling such that the UE is enabled to correctly find a corresponding PUCCH transmission of which a spatial relationship needs to be reset according to the TRP where a beam failure (link failure) occurs. This enables the UE to transmit the PUCCH by using a correct beam, thereby improving system performance.

In the embodiment of this disclosure, the first downlink control information is also related to the first TRP. Thus, a time interval between transmission of the first downlink control information (BFRR) and subsequent transmission of the first uplink control information (PUCCH) of which the beam direction being reset may be reduced, and the system performance may be improved. For example, when an interaction time between different TRPs is relatively long, if the first downlink control information and the subsequent first uplink control information of which the beam direction being reset are transmitted via different TRPs, after the first downlink control information is transmitted via one TRP, another TRP may confirm the transmission after a long time, and then adjust beam direction for receiving the first uplink control information, which leads to higher latency and degradation of system performance.

In some embodiments, that the first downlink control information is related to the first TRP refers to that the first downlink control information is received in a BFR search space, and the BFR search space is related to the first TRP.

In some embodiments, that the first downlink control information is related to the first TRP refers to that the first downlink control information is received in a control resource set, and the control resource set is related to the first TRP.

In the embodiments of this disclosure, in some embodiments, as shown in FIG. 11, before the terminal equipment receives the first downlink control information, the method further includes:

1100: the terminal equipment transmits second information to the network device, the second information being associated with an index of the first reference signal and/or an index of the first TRP.

Therefore, the network device may identify the first reference signal based on the index of the TRP and the index of the reference signal, and then transmit the first downlink control information and/or receive the first uplink control information according to spatial information (QCL parameter) of the reference signal. In some embodiments, the index of the first reference signal is expressed as $q_{new}$.

In the embodiments of this disclosure, in some embodiments, that after the terminal equipment receives the first downlink control information refers to after 28 symbols from the last symbol of the first downlink control information is received by the terminal equipment. Before that, the terminal equipment may receive the downlink control information associated with the first TRP by using other beams, which is not limited in this disclosure.

In the embodiments of this disclosure, in some embodiments, the terminal equipment may transmit the first uplink control information in a primary cell, and may also transmit the first uplink control information in a secondary cell. Here, the primary cell is, for example, a PCell, and a PSCell, etc., and the secondary cell is, for example, an SCell, etc., and reference may be made to relevant techniques for definitions thereof, which shall not be described herein any further.

The method of the embodiment of this disclosure shall be described below by way of an example.

In this example, it is taken as an example that a cell in which the UE operates is a PCell, and the UE is related to two TRPs, or, a control resource set configured for the UE is related to two TRPs.

That the control resource set configured for the UE is related to two TRPs is that, for example, if a UE is configured with first CORESETs and second CORESETs on an active downlink BWP of a serving cell, these first CORESETs are not configured with CORESETPoolIndex or are configured with CORESETPoolIndex with a value of 0, and these second CORESETs are configured with CORESETPoolIndex with a value of 1, it is deemed that the UE is related to two TRPs.

The above conditions may be described as follows:

---

If a UE
- is not provided CORESETPoolIndex or is provided CORESETPoolIndex with a value of 0 for first CORESETs on active DL BWPs of serving cells, and
- is provided CORESETPoolIndex with a value of 1 for second CORESETs on active DL BWPs of the serving cells,

---

In this example, assuming that the UE finds that a beam failure (link failure) occurs in a link related to TRP #0 by detecting a reference signal related to TRP #0 (such as detecting a reference signal related to a CORESET configured with no CORESETPoolIndex or configured with CORESETPoolIndex with a value of 0), the UE start a corresponding link recovery procedure. FIG. 12 shows the link recovery procedure. As shown in FIG. 12, during the link recovery procedure, the UE may execute the following steps:

step 1: the UE transmits uplink information (the above second information) to the gNB (gNB TRP #0), the uplink information being, for example, transmitted via a PRACH or a PUCCH; the uplink information may be information (such as the index of the first reference signal, which may be expressed as $q_{new}$) related to the identified candidate beam reference signal (the above first reference signal), and the uplink information may also be the index (TRP #0) of the TRP associated with the reference signal;

a method for acquiring $q_{new}$ is as described above, and shall not be described herein any further;

step 2: the UE receives beam failure recovery response (BFRR, the above first downlink control signal) according to the antenna port QCL parameter associated with the above reference signal (the index of the reference signal is $q_{new}$);

the above BFRR is response of step 1, which may be a DCI format scrambled by a C-RNTI or an MCS-C-RNTI, or a DCI format scrambled by C-RNTI and used for scheduling a PUSCH;

step 3: after 28 symbols from the last symbol of the above BFRR is received by the UE, when transmitting the first uplink control information (PUCCH) to TRP #0, the UE transmits the PUCCH according to the spatial domain filter corresponding to the reference signal and/or the power corresponding to the reference signal; where, the power control parameter $q_u=0$, and $l=0$, wherein, reference may be made to relevant techniques for meanings of $q_u$ and $l$.

As shown in FIG. 12, after the last symbol of the BFRR is received by the UE and before the above-mentioned 28 symbols, the UE may possibly also uplink control information (PUCCH) to another TRP (such as TRP #1 shown in FIG. 12).

FIG. 13 shows a case corresponding to the case in FIG. 12. As shown in FIG. 13, if other conditions are similar, but the uplink control information (PUCCH) is related to TRP #1, the spatial domain filter and/or power corresponding to transmission of the PUCCH is not adjusted, that is, there is no step 3 in FIG. 12.

The relationship between the transmission of the first uplink control information and the TRP has been described above, which shall not be described herein any further.

It should be noted that FIG. 11 only schematically illustrates the embodiment of this disclosure; however, this disclosure is not limited thereto. For example, an order of execution of the steps may be appropriately adjusted, and furthermore, some other steps may be added, or some steps therein may be reduced. And appropriate variants may be made by those skilled in the art according to the above contents, without being limited to what is contained in FIG. 11.

According to the method of the embodiment of this disclosure, by determining the spatial domain filter and/or power control parameter for transmitting the PUCCH (the first uplink control information) according to the TRP where link recovery occurs, after receiving the gNB response, the terminal equipment may transmit the PUCCH by using appropriate spatial domain filter and/or power control parameter according to whether the PUCCH is transmitted via the TRP, thereby improving the reliability of the system.

Embodiment of a Third Aspect

The embodiment of this disclosure provides a wireless communication method, which shall be described from the network side. This method is process at a network side corresponding to the method of the embodiment of the first or second aspect, with contents identical to those in the embodiments of the first and second aspects being not going to be repeated herein any further.

In the embodiment of this disclosure, an implementing subject of the method (referred to as a network device) is, for example, the TRP with a beam failure (or link failure) occurs between it and the terminal equipment in the embodiments of the first and second aspects, such as TRP #2 shown in FIGS. 4 and 5, or TRP #2 shown in FIGS. 9 and 10, or TRP #0 shown in FIG. 7, or TRP #0 shown in FIG. 12.

FIG. 14 is a schematic diagram of an example of the wireless communication method of the embodiment of this disclosure. As shown in FIG. 14, the method includes:

1401: the network device transmits configuration information to a terminal equipment, the configuration information configuring that the terminal equipment is associated with at least two TRPs;

1402: the network device receives second information transmitted by the terminal equipment, the second information being related to an index of a first reference signal and/or an index of a TRP associated with the first reference signal; and

1403: the network device identifies the first reference signal according to the second information, and transmits first downlink control information to the terminal equipment.

Therefore, corresponding to the method of the embodiment of the first aspect, after receiving the first downlink control information, the terminal equipment may monitor the second downlink control information according to the antenna port QCL parameter the same as the antenna port QCL parameter associated with the first reference signal, wherein, the first reference signal is related to the first TRP in the at least two TRPs; the TRP associated with the second downlink control information is identical to the first TRP associated with the first reference signal; and the first reference signal is identified from at least one reference signal for beam recovery. The process at the terminal equipment side has been described in detail in the embodiment of the first aspect, and contents thereof are incorporated herein, which shall not be repeated herein any further.

In addition, corresponding to the method of the embodiment of the second aspect, after receiving the first downlink control information, the terminal equipment may transmit the first uplink control information according to the spatial filter and/or power associated with the first reference signal, wherein, the first reference signal is related to the first TRP in the at least two TRPs; the TRP associated with the first uplink control information is identical to the first TRP associated with the first reference signal; and the first reference signal is identified from at least one reference signal for beam recovery. The process at the terminal equipment side has been described in detail in the embodiment of the second aspect, and contents thereof are incorporated herein, which shall not be repeated herein any further.

It should be noted that FIG. 14 only schematically illustrates the embodiment of this disclosure; however, this disclosure is not limited thereto. For example, an order of execution of the steps may be appropriately adjusted, and furthermore, some other steps may be added, or some steps therein may be reduced. And appropriate variants may be made by those skilled in the art according to the above contents, without being limited to what is contained in FIG. 14.

According to the method of the embodiment of this disclosure, the network device identifies the TRP where a link failure occurs and the corresponding first reference signal for link recovery according to the second information reported by the terminal. After the network device receives the second information and identifies the first reference signal, it transmits gNB response (the first downlink control information). After transmitting the gNB response (the first downlink control information), the network device may transmit the PDCCH or receive the PUCCH by using an appropriate spatial direction according to the first reference signal and according to the relationship between the TRP corresponding to the reference signal and the PDCCH (the second downlink control information) or the PUCCH (the first uplink control information), thereby improving the reliability of the system.

Embodiment of a Fourth Aspect

The embodiment of this disclosure provides a wireless communication apparatus. The apparatus may be, for example, a terminal equipment, or one or some components or assemblies configured in the terminal equipment.

FIG. 15 is a schematic diagram of the wireless communication apparatus of the embodiment of this disclosure. As principles of the apparatus for resolving problems are similar to that of the method in the embodiment of the first aspect, reference may be made to the implementation of the method in the embodiment of the first aspect for implementation of the apparatus, with identical contents being not going to be repeated herein any further.

As shown in FIG. 15, a wireless communication apparatus 1500 of the embodiment of this disclosure includes: a monitoring unit 1501 configured to monitor second downlink control information according to an antenna port QCL parameter the same as an antenna port QCL parameter associated with a first reference signal after the terminal equipment receives first downlink control information associated with beam failure or link failure.

The first reference signal is associated with a first TRP in the at least two TRPs, a TRP associated with the second downlink control information is identical to the first TRP associated with the first reference signal, and the first reference signal is identified from at least one reference signal for beam recovery.

In some embodiments, that the first reference signal is associated with the first TRP is indicated via RRC signaling. For example, the RRC signaling indicates an ID of a TRP corresponding to the first reference signal. And for another example, the RRC signaling is RRC signaling for indicating the first TRP.

In some embodiments, that the first reference signal is identified from at least one reference signal for beam recovery refers to that: the first reference signal is identified from a candidate beam reference signal associated with the first TRP in a candidate beam reference signal list.

In some embodiments, that the first reference signal is identified from at least one reference signal for beam recovery refers to that: the first reference signal is identified from a candidate beam reference signal list for the first TRP.

In some embodiments, that the terminal equipment is related to at least two TRPs refers to that: the terminal equipment is configured with control resource sets (CORESETs) for the at least two TRPs.

In some embodiments, that the terminal equipment is related to at least two TRPs refers to that: on an active downlink BWP of a serving cell, the terminal equipment is configured with a first control resource set and a second control resource set, wherein, the first control resource set is not configured with a CORESETPoolIndex or is configured with a CORESETPoolIndex with a value 0; and the second control resource set is configured with a CORESETPoolIndex with a value 1.

In some embodiments, that the TRP associated with the second downlink control information is identical to the first TRP associated with the first reference signal refers to that the second downlink control information is monitored in a control resource set (CORESET), and the TRP associated with the control resource set (CORESET) is identical to the first TRP.

In some embodiments, as shown in FIG. 15, the apparatus 1500 further includes:

- a receiving unit 1502 configured to receive the first downlink control information according to the antenna port QCL parameter associated with the first reference signal.

In some embodiments, the first downlink control information is associated with the first TRP. In some embodiments, that the first downlink control information is associated with the first TRP refers to that the first downlink control information is received in a BFR search space, and the BFR search space is associated with the first TRP. In some embodiments, that the first downlink control information is associated with the first TRP refers to that the first downlink control information is received in a control resource set, and the control resource set is associated with the first TRP.

In some embodiments, as shown in FIG. 15, the apparatus 1500 further includes:

- a transmitting unit 1503 configured to transmit an index of the first reference signal to a network device before the terminal equipment receives the first downlink control information.

In some embodiments, the second downlink control information is monitored in a control resource set, an index of the control resource set being 0.

In some embodiments, that after the terminal equipment receives the first downlink control information refers to after 28 symbols from the last symbol of the first downlink control information is received by the terminal equipment.

In some embodiments, the monitoring unit 1501 monitors the second downlink control information in a primary cell (PCell or PSCell) or a secondary cell (SCell).

In some embodiments, the TRP is equivalent to at least one of the following: a control resource set (CORESET) pool; or a transmission configuration indication (TCI) state.

It should be noted that the components or modules related to this disclosure are only described above. However, this disclosure is not limited thereto, and the wireless communication apparatus 1500 of the embodiment of this disclosure may further include other components or modules, and reference may be made to related techniques for particulars of these components or modules.

Furthermore, for the sake of simplicity, connection relationships between the components or modules or signal profiles thereof are only illustrated in FIG. 15. However, it should be understood by those skilled in the art that such related techniques as bus connection, etc., may be adopted. And the above components or modules may be implemented by hardware, such as a processor, a memory, a transmitter, and a receiver, which are not limited in the embodiment of this disclosure.

According to the embodiment of this disclosure, corresponding to the embodiment of the first aspect, the reliability of the system is improved.

Embodiment of a Fifth Aspect

The embodiment of this disclosure provides a wireless communication apparatus. The apparatus may be, for example, a terminal equipment, or one or some components or assemblies configured in the terminal equipment.

FIG. 16 is a schematic diagram of the wireless communication apparatus of an embodiment of this disclosure. As principles of the apparatus for solving problems are similar to that of the method in the embodiment of the second aspect, reference may be made to the implementation of the method in the embodiment of the second aspect for implementation of the apparatus, with identical contents being not going to be repeated herein any further.

As shown in FIG. 16, a wireless communication apparatus 1600 of the embodiment of this disclosure includes: a first transmitting unit 1601 configured to transmit first uplink control information according to a spatial filter and/or power associated with a first reference signal after the terminal equipment receives first downlink control information associated with beam failure or link failure.

The first reference signal is associated with a first TRP in the at least two TRPs, a TRP associated with the first uplink control information is identical to the first TRP associated with the first reference signal, and the first reference signal is identified from at least one reference signal for beam recovery.

In some embodiments, that the first reference signal is associated with the first TRP is indicated via RRC signaling. For example, the RRC signaling indicates an ID of a TRP corresponding to the first reference signal. And for another example, the RRC signaling is RRC signaling for indicating the first TRP.

In some embodiments, that the first reference signal is identified from at least one reference signal for beam recovery refers to that: the first reference signal is identified from a candidate beam reference signal associated with the first TRP in a candidate beam reference signal list.

In some embodiments, that the first reference signal is identified from at least one reference signal for beam recovery refers to that: the first reference signal is identified from a candidate beam reference signal list for the first TRP.

In some embodiments, that the terminal equipment is related to at least two TRPs refers to that the terminal equipment is configured with control resource sets (CORESETs) for the at least two TRPs.

In some embodiments, that the terminal equipment is related to at least two TRPs refers to that the terminal equipment is configured with a first control resource set and a second control resource set on an active downlink BWP of a serving cell, wherein the first control resource set is not configured with CORESETPoolIndex or is configured with CORESETPoolIndex with a value of 0, and the second control resource set is configured with CORESETPoolIndex with a value of 1.

In some embodiments, that a TRP associated with the first uplink control information is identical to the first TRP associated with the first reference signal refers to at least one of the following that:

- a TRP associated with a control resource set used for receiving DCI triggering the first uplink control information is identical to the first TRP;
- a reference signal for determining space configuration and corresponding to the first uplink control information is identical to a reference signal for beam failure detection and/or for determining candidate beam recovery and associated with the first TRP; or
- a TRP associated with a resource corresponding to the first uplink control information is identical to the first TRP.

In some embodiments, an ID of the TRP associated with the resource corresponding to the first uplink control information is indicated by RRC signaling.

In some embodiments, as shown in FIG. 16, the apparatus 1600 further includes:

- a receiving unit 1602 configured to receive the first downlink control information according to an antenna port QCL parameter associated with the first reference signal.

In some embodiments, the first downlink control information is related to the first TRP. In some embodiments, that the first downlink control information is related to the TRP refers to that the first downlink control information is received in a BFR search space, and the BFR search space is related to the first TRP. In some embodiments, that the first downlink control information is related to the TRP refers to that the first downlink control information is received in a control resource set, and the control resource set is related to the first TRP.

In some embodiments, as shown in FIG. 16, the apparatus 1600 further includes:

- a second transmitting unit 1603 configured to transmit an index of the first reference signal to a network device before the terminal equipment receives the first downlink control information.

In some embodiments, that after the terminal equipment receives the first downlink control information refers to after 28 symbols from the last symbol of the first downlink control information is received by the terminal equipment.

In some embodiments, the first transmitting unit 1601 transmits the first uplink control information in a primary cell (PCell or PSCell) or a secondary cell (SCell).

In some embodiments, the TRP is equivalent to at least one of the following: a control resource set (CORESET) pool; or a transmission configuration indication (TCI) state.

It should be noted that the components or modules related to this disclosure are only described above. However, this disclosure is not limited thereto, and the wireless communication apparatus 1600 of the embodiment of this disclosure may further include other components or modules, and reference may be made to related techniques for particulars of these components or modules.

Furthermore, for the sake of simplicity, connection relationships between the components or modules or signal profiles thereof are only illustrated in FIG. 16. However, it should be understood by those skilled in the art that such related techniques as bus connection, etc., may be adopted. And the above components or modules may be implemented by hardware, such as a processor, a memory, a transmitter, and a receiver, which are not limited in the embodiment of this disclosure.

According to the embodiment of this disclosure, corresponding to the embodiment of the second aspect, the reliability of the system is improved.

Embodiment of a Sixth Aspect

The embodiment of this disclosure provides a wireless communication apparatus. The apparatus may be, for example, a network device, or one or some components or assemblies configured in the network device. As principles of the apparatus are similar to that of the method in the embodiment of the third aspect, reference may be made to the implementation of the method in the embodiment of the third aspect for implementation of the apparatus, with identical contents being not going to be repeated herein any further.

FIG. 17 is a schematic diagram of the wireless communication apparatus of the embodiment of this disclosure. As shown in FIG. 17, a wireless communication apparatus 1700 of the embodiment of this disclosure includes:

- a first transmitting unit 1701 configured to transmit configuration information to a terminal equipment, the configuration information configuring that the terminal equipment is associated with at least two TRPs;
- a receiving unit 1702 configured to receive second information transmitted by the terminal equipment, the second information being related to an index of a first reference signal and/or an index of a TRP associated with the first reference signal; and
- a second transmitting unit 1703 configured to determine the first reference signal according to the second information, and transmit first downlink control information to the terminal equipment.

Therefore, on the one hand, after receiving the first downlink control information, the terminal equipment may monitor the second downlink control information according to an antenna port QCL parameter the same as an antenna port QCL parameter associated with the first reference signal, wherein, the first reference signal is related to the first TRP in the at least two TRPs; the TRP associated with the second downlink control information is identical to the first TRP associated with the first reference signal; and the first reference signal is identified from at least one reference signal for beam recovery.

In addition, on the other hand, after receiving the first downlink control information, the terminal equipment may transmit the first uplink control information according to the spatial filter and/or power associated with the first reference signal, wherein, the first reference signal is related to the first TRP in the at least two TRPs; the TRP associated with the first uplink control information is identical to the first TRP associated with the first reference signal; and the first reference signal is identified from at least one reference signal for beam recovery.

It should be noted that the components or modules related to this disclosure are only described above. However, this disclosure is not limited thereto, and the wireless communication apparatus 1700 of the embodiment of this disclosure may further include other components or modules, and reference may be made to related techniques for particulars of these components or modules.

Furthermore, for the sake of simplicity, connection relationships between the components or modules or signal profiles thereof are only illustrated in FIG. 17. However, it should be understood by those skilled in the art that such related techniques as bus connection, etc., may be adopted. And the above components or modules may be implemented by hardware, such as a processor, a memory, a transmitter, and a receiver, which are not limited in the embodiment of this disclosure.

According to the apparatus of the embodiment of this disclosure, the reliability of the system is improved.

Embodiment of a Seventh Aspect

Figure 18:
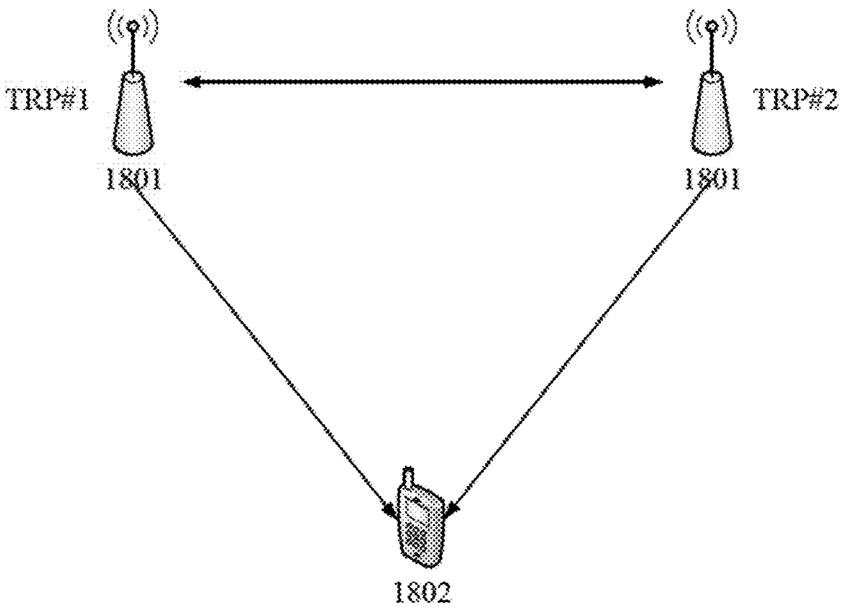
FIG. 18 is schematic diagram of the communication system of an embodiment of a seventh aspect of this disclosure.

The embodiment of this disclosure provides a communication system. FIG. 18 is a schematic diagram of the communication system 1800 of the embodiment of this disclosure. As shown in FIG. 18, the communication system 1800 includes a network device 1801 and a terminal equipment 1802. For the sake of simplicity, an example having only one terminal equipment and two network devices is schematically given in FIG. 18, and the network device may be, for example, a TRP; however, the embodiment of this disclosure is not limited thereto.

In the embodiment of this disclosure, existing traffics or traffics that may be implemented in the future may be performed between the network device 1801 and the terminal equipment 1802. For example, such traffics may include but not limited to enhanced mobile broadband (eMBB), massive machine type communication (mMTC), ultra-reliable and low-latency communication (URLLC), and vehicle to everything (V2X).

In some embodiments, the network device 1801 transmits configuration information to the terminal equipment 1802, the configuration information configuring that the terminal equipment is related to at least two TRPs, receives second information transmitted by the terminal equipment 1802, the second information being related to an index of a first reference signal and/or an index of a TRP, determines the first reference signal according to the second information, and transmits first downlink control information according to the first reference signal, so that the terminal equipment 1802 monitors second downlink control information according to an antenna port QCL parameter identical the same as an antenna port QCL parameter associated with the first reference signal, or transmits the first uplink control information according to a spatial domain filter and/or power related to the first reference signal. Reference may be made to the embodiments of the third and sixth aspects for relevant contents of the network device 1801, which shall not be described herein any further; and reference may be made to the embodiments of the first, second, fourth and fifth aspects for relevant contents of the terminal equipment 1802, which shall not be described herein any further.

The embodiment of this disclosure further provides a terminal equipment, which may be, for example, a UE; however, this disclosure is not limited thereto, and it may also be another equipment.

Figure 19:
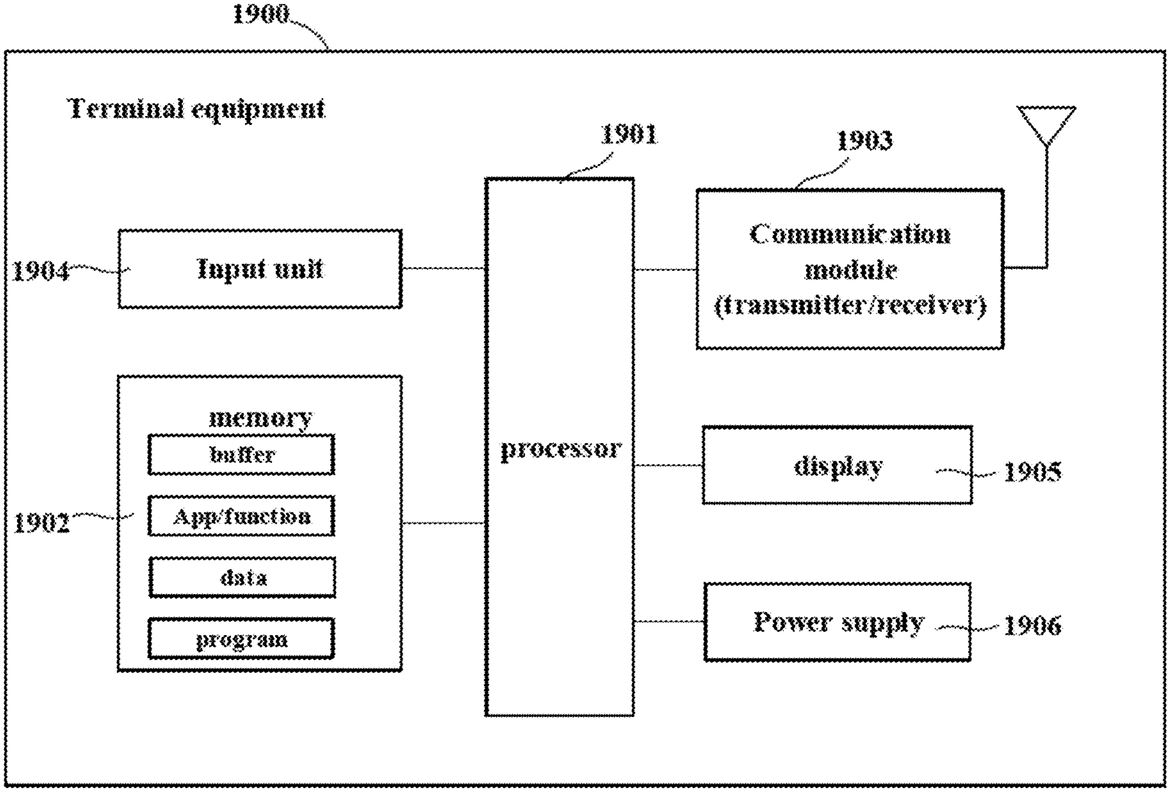
FIG. 19 is schematic diagram of the terminal equipment of the embodiment of the seventh aspect of this disclosure.

FIG. 19 is a schematic diagram of the terminal equipment of the embodiment of this disclosure. As shown in FIG. 19, the terminal equipment 1900 may include a processor 1901 and a memory 1902, the memory 1902 storing data and a program and being coupled to the processor 1901. It should be noted that this figure is illustrative only, and other types of structures may also be used, so as to supplement or replace this structure and achieve a telecommunications function or other functions.

For example, the processor 1901 may be configured to execute a program to carry out the wireless communication method as described in the embodiment of the first or the second aspect.

As shown in FIG. 19, the terminal equipment 1900 may further include a communication module 1903, an input unit 1904, a display 1905, and a power supply 1906; wherein functions of the above components are similar to those in the related art, which shall not be described herein any further. It should be noted that the terminal equipment 1900 does not necessarily include all the parts shown in FIG. 19, and the above components are not necessary. Furthermore, the terminal equipment 1900 may include parts not shown in FIG. 19, and the related art may be referred to.

The embodiment of this disclosure further provides a network device, which may be, for example, a TRP. However, this disclosure is not limited thereto, and it may also be another network device.

Figure 20:
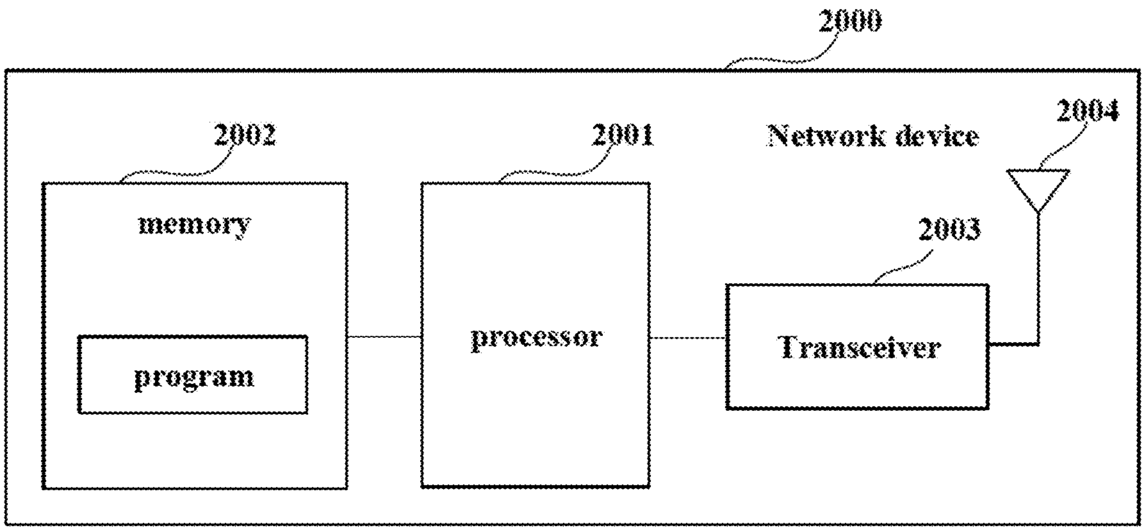
FIG. 20 is schematic diagram of the network device of the embodiment of the seventh aspect of this disclosure.

FIG. 20 is a schematic diagram of the network device of the embodiment of this disclosure. As shown in FIG. 20, the network device 2000 may include a processor 2001 (such as a central processing unit (CPU)) and a memory 2002, the memory 2002 being coupled to the processor 2001. The memory 2002 may store various data, and furthermore, it may store a program for data processing, and execute the program under control of the processor 2001.

For example, the processor 2001 may be configured to execute a program to carry out the wireless communication method as described in the embodiment of the third aspect.

Furthermore, as shown in FIG. 20, the network device 2000 may include a transceiver 2003, and an antenna 2004, etc. Functions of the above components are similar to those in the related art, and shall not be described herein any further. It should be noted that the network device 2000 does not necessarily include all the parts shown in FIG. 20, and furthermore, the network device 2000 may include parts not shown in FIG. 20, and the related art may be referred to.

An embodiment of this disclosure provides a computer readable program, which, when executed in a terminal equipment, will cause a computer to carry out the wireless communication method as described in the embodiment of the first or the second aspect in the terminal equipment.

An embodiment of this disclosure provides a storage medium storing a computer readable program, which will cause a computer to carry out the wireless communication method as described in the embodiment of the first or the second aspect in a terminal equipment.

An embodiment of this disclosure provides a computer readable program, which, when executed in a network device, will cause a computer to carry out the wireless communication method as described in the embodiment of the third aspect in the network device.

An embodiment of this disclosure provides a storage medium storing a computer readable program, which will cause a computer to carry out the wireless communication method as described in the embodiment of the third aspect in a network device.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. This disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in the drawings may either correspond to software modules of procedures of a computer program, or correspond to hardware modules. Such software modules may respectively correspond to the steps shown in the drawings. And the hardware module, for example, may be carried out by firming the soft modules by using a field programmable gate array (FPGA).

The soft modules may be located in an RAM, a flash memory, an ROM, an EPROM, an EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the drawings may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the drawings may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

As to the implementations disclosed in the embodiments, following supplements are further disclosed.

1. A wireless communication method, applicable to a terminal equipment, the terminal equipment being related to at least two TRPs, wherein the method includes:

monitoring second downlink control information by the terminal equipment according to an antenna port QCL parameter the same as an antenna port QCL parameter associated with a first reference signal after the terminal equipment receives first downlink control information associated with beam failure or link failure, wherein, the first reference signal is associated with a first TRP in the at least two TRPs, a TRP associated with the second downlink control information is identical to the first TRP associated with the first reference signal, and the first reference signal is identified from at least one reference signal for beam recovery.

2. The method according to supplement 1, wherein that the first reference signal is associated with the first TRP is indicated via RRC signaling.

2a. The method according to supplement 2, wherein the RRC signaling indicates an ID of a TRP corresponding to the first reference signal.

2b. The method according to supplement 2, wherein the RRC signaling is RRC signaling for indicating the first TRP.

3. The method according to supplement 1, wherein that the first reference signal is identified from at least one reference signal for beam recovery refers to that:

the first reference signal is identified from a candidate beam reference signal associated with the first TRP in a candidate beam reference signal list.

4. The method according to supplement 1, wherein that the first reference signal is identified from at least one reference signal for beam recovery refers to that:

the first reference signal is identified from a candidate beam reference signal list for the first TRP.

5. The method according to supplement 1, wherein that the terminal equipment is related to at least two TRPs refers to that:

the terminal equipment is configured with control resource sets (CORESETs) for the at least two TRPs.

6. The method according to supplement 1, wherein that the terminal equipment is related to at least two TRPs refers to that:

on an active downlink BWP of a serving cell, the terminal equipment is configured with a first control resource set and a second control resource set, wherein, the first control resource set is not configured with a CORESETPoolIndex or is configured with a CORESETPoolIndex with a value 0;

and the second control resource set is configured with a CORESETPoolIndex with a value 1.

7. The method according to supplement 1, wherein that the TRP associated with the second downlink control information is identical to the first TRP associated with the first reference signal refers to that:

the second downlink control information is monitored in a control resource set (CORESET), and the TRP associated with the control resource set (CORESET) is identical to the first TRP.

8. The method according to supplement 1, wherein the method further includes:

receiving the first downlink control information by the terminal equipment according to the antenna port QCL parameter associated with the first reference signal.

9. The method according to supplement 1, wherein the first downlink control information is related to the first TRP.

9a. The method according to supplement 9, wherein that the first downlink control information is related to the first TRP refers to that:

the first downlink control information is received in a BFR search space, and the BFR search space is related to the first TRP.

9b. The method according to supplement 9, wherein that the first downlink control information is related to the first TRP refers to that:

the first downlink control information is received in a control resource set, and the control resource set is related to the first TRP.

10. The method according to supplement 1, wherein before receiving the first downlink control information, the method further includes:

transmitting second information by the terminal equipment to a network device, the second information being associated with an index of the first reference signal and/or an index of a TRP associated with the first reference signal.

11. The method according to supplement 1, wherein the second downlink control information is monitored in a control resource set, an index of the control resource set being 0.

12. The method according to supplement 1, wherein that after the terminal equipment receives the first downlink control information refers to:

after 28 symbols from the last symbol of the first downlink control information is received by the terminal equipment.

13. The method according to supplement 1, wherein the terminal equipment monitors the second downlink control information in a primary cell (PCell or PSCell) or a secondary cell (SCell).

14. The method according to any one of supplements 1-13, wherein the TRP is equivalent to at least one of the following:

a control resource set (CORESET) pool; or a transmission configuration indication (TCI) state.

15. A wireless communication method, applicable to a terminal equipment, the terminal equipment being related to at least two TRPs, wherein the method includes:

transmitting first uplink control information by the terminal equipment according to a spatial filter and/or power associated with a first reference signal after the terminal equipment receives first downlink control information associated with beam failure or link failure, wherein, the first reference signal is associated with a first TRP in the at least two TRPs, a TRP associated with the first uplink control information is identical to the first TRP associated with the first reference signal, and the first reference signal is identified from at least one reference signal for beam recovery.

16. The method according to supplement 15, wherein that the first reference signal is associated with the first TRP is indicated via RRC signaling.

16a. The method according to supplement 16, wherein the RRC signaling indicates an ID of a TRP corresponding to the first reference signal.

16b. The method according to supplement 16, wherein the RRC signaling is RRC signaling for indicating the first TRP.

17. The method according to supplement 15, wherein that the first reference signal is identified from at least one reference signal for beam recovery refers to that:

the first reference signal is identified from a candidate beam reference signal associated with the first TRP in a candidate beam reference signal list.

18. The method according to supplement 15, wherein that the first reference signal is identified from at least one reference signal for beam recovery refers to that:

the first reference signal is identified from a candidate beam reference signal list for the first TRP.

19. The method according to supplement 15, wherein that the terminal equipment is related to at least two TRPs refers to that:

the terminal equipment is configured with control resource sets for the at least two TRPs.

20. The method according to supplement 15, wherein that the terminal equipment is related to at least two TRPs refers to that:

on an active downlink BWP of a serving cell, the terminal equipment is configured with a first control resource set and a second control resource set; wherein, the first control resource set is not configured with a CORESETPoolIndex or is configured with a CORESETPoolIndex with a value 0;

and the second control resource set is configured with a CORESETPoolIndex with a value 1.

21. The method according to supplement 15, wherein that a TRP associated with the first uplink control information is identical to the first TRP associated with the first reference signal refers to at least one of the following that:

a TRP associated with a control resource set used for receiving DCI triggering the first uplink control information is identical to the first TRP;

a reference signal for determining space configuration and corresponding to the first uplink control information is identical to a reference signal for beam failure detection and/or for determining candidate beam recovery and associated with the first TRP; or a TRP associated with a resource corresponding to the first uplink control information is identical to the first TRP.

21a. The method according to supplement 21, wherein an ID of a TRP associated with a resource corresponding to the first uplink control information is indicated by RRC signaling.

22. The method according to supplement 15, wherein the method further includes:

receiving the first downlink control information by the terminal equipment according to an antenna port QCL parameter associated with the first reference signal.

23. The method according to supplement 15, wherein the first downlink control information is related to the first TRP.

23a. The method according to supplement 23, wherein that the first downlink control information is related to the first TRP refers to that:

the first downlink control information is received in a BFR search space, and the BFR search space is related to the first TRP.

23b. The method according to supplement 23, wherein that the first downlink control information is related to the first TRP refers to that:

the first downlink control information is received in a control resource set, and the control resource set is related to the first TRP.

24. The method according to supplement 15, wherein before receiving the first downlink control information, the method further includes:

transmitting second information by the terminal equipment to a network device, the second information being associated with an index of the first reference signal and/or an index of a TRP associated with the first reference signal.

25. The method according to supplement 15, wherein that after the terminal equipment receives the first downlink control information refers to:

after 28 symbols from the last symbol of the first downlink control information is received by the terminal equipment.

26. The method according to supplement 15, wherein the terminal equipment transmits the first uplink control information in a primary cell (PCell or PSCell) or a secondary cell (SCell).

27. The method according to any one of supplements 15-26, wherein the TRP is equivalent to at least one of the following:
- a control resource set (CORESET) pool; or
- a transmission configuration indication (TCI) state.

28. A terminal equipment, including a memory and a processor, the memory storing a computer program, and the processor being configured to execute the computer program to carry out the method as described in any one of supplements 1-27.

29. A communication system, including a terminal equipment and a network device, wherein the terminal equipment is configured to carry out the method as described in any one of supplements 1-27.

What is claimed is:

1. A wireless communication apparatus, configured in a terminal equipment, the terminal equipment being related to at least two transmission and reception points (TRPs), the apparatus comprising:
- a monitor configured to monitor second downlink control information according to an antenna port quasi-collocation (QCL) parameter the same as an antenna port QCL parameter associated with a first reference signal after the terminal equipment receives first downlink control information associated with beam failure or link failure, wherein,
  - the first reference signal is associated with a first TRP in the at least two TRPs,
  - a TRP associated with the second downlink control information is identical to the first TRP associated with the first reference signal, and
  - the first reference signal is identified from at least one reference signal for beam recovery; and
- a transmitter configured to transmit second information to a network device before receiving the first downlink control information, the second information being associated with an index of the first reference signal and/or an index of a TRP associated with the first reference signal.

2. The apparatus according to claim 1, wherein that the first reference signal is associated with the first TRP is indicated via radio resource control (RRC) signaling.

3. The apparatus according to claim 2, wherein the RRC signaling indicates an identifier (ID) of a TRP corresponding to the first reference signal.

4. The apparatus according to claim 2, wherein the RRC signaling is RRC signaling for indicating the first TRP.

5. The apparatus according to claim 1, wherein that the first reference signal is identified from at least one reference signal for beam recovery refers to that:
- the first reference signal is identified from a candidate beam reference signal associated with the first TRP in a candidate beam reference signal list.

6. The apparatus according to claim 1, wherein that the first reference signal is identified from at least one reference signal for beam recovery refers to that:
- the first reference signal is identified from a candidate beam reference signal list for the first TRP.

7. The apparatus according to claim 1, wherein that the terminal equipment is related to at least two TRPs refers to that:
- on an active downlink BWP of a serving cell, the terminal equipment is configured with a first control resource set and a second control resource set, wherein,
- the first control resource set is not configured with a CORESETPoolIndex or is configured with a CORESETPoolIndex with a value 0; and
- the second control resource set is configured with a CORESETPoolIndex with a value 1.

8. The apparatus according to claim 1, wherein the apparatus further comprises:
- a receiver configured to receive the first downlink control information according to the antenna port QCL parameter associated with the first reference signal.

9. The apparatus according to claim 1, wherein the TRP is equivalent to at least one of the following:
- a control resource set (CORESET) pool; or
- a transmission configuration indication (TCI) state.

10. The apparatus according to claim 1, wherein the apparatus further comprises:
- a transmitter configured to transmit uplink control information, the uplink control information being associated with the first TRP in the at least two TRPs.

11. A wireless communication apparatus, configured in a terminal equipment, the terminal equipment being related to at least two transmission and reception points (TRPs), the apparatus comprising:
- a monitor configured to monitor second downlink control information according to an antenna port quasi-collocation (QCL) parameter the same as an antenna port QCL parameter associated with a first reference signal after the terminal equipment receives first downlink control information associated with beam failure or link failure, wherein,
  - the first reference signal is associated with a first TRP in the at least two TRPs,
  - a TRP associated with the second downlink control information is identical to the first TRP associated with the first reference signal, and
  - the first reference signal is identified from at least one reference signal for beam recovery; and
- a first transmitter configured to transmit first uplink control information according to a spatial filter and/or power associated with a first reference signal after the terminal equipment receives first downlink control information associated with beam failure or link failure, wherein,
- the first reference signal is associated with a first TRP in the at least two TRPs,
- a TRP associated with the first uplink control information is identical to the first TRP associated with the first reference signal, and
- the first reference signal is identified from at least one reference signal for beam recovery.

12. The apparatus according to claim 11, wherein that the first reference signal is associated with the first TRP is indicated via RRC signaling.

13. The apparatus according to claim 12, wherein the RRC signaling is RRC signaling for indicating the first TRP.

14. The apparatus according to claim 11, wherein that the first reference signal is identified from at least one reference signal for beam recovery refers to that:
- the first reference signal is identified from a candidate beam reference signal associated with the first TRP in a candidate beam reference signal list.

15. The apparatus according to claim 11, wherein that the first reference signal is identified from at least one reference signal for beam recovery refers to that:

the first reference signal is identified from a candidate beam reference signal list for the first TRP.

16. The apparatus according to claim 11, wherein that a TRP associated with the first uplink control information is identical to the first TRP associated with the first reference signal refers to at least one of the following:

a TRP associated with a control resource set used for receiving DCI triggering the first uplink control information is identical to the first TRP;

a reference signal for determining space configuration and corresponding to the first uplink control information is identical to a reference signal for beam failure detection and/or for determining candidate beam recovery and associated with the first TRP; or a TRP associated with a resource corresponding to the first uplink control information is identical to the first TRP.

17. The apparatus according to claim 11, wherein the apparatus further comprises:

a receiver configured to receive the first downlink control information according to an antenna port QCL parameter associated with the first reference signal.

18. The apparatus according to claim 11, wherein the apparatus further comprises:

a second transmitter configured to transmit second information to a network device before receiving the first downlink control information, the second information being associated with an index of the first reference signal and/or an index of a TRP associated with the first reference signal.

19. The apparatus according to claim 11, wherein the TRP is equivalent to at least one of the following:

a control resource set (CORESET) pool; or a transmission configuration indication (TCI) state.

* * * * *